(12) United States Patent
Shao

(10) Patent No.: US 12,338,074 B2
(45) Date of Patent: Jun. 24, 2025

(54) CONTROL METHODS, SYSTEMS, AND EQUIPMENT FOR HANDLING EQUIPMENT BASED ON INDUSTRIAL INTERNET OF THINGS

(71) Applicant: CHENGDU QINCHUAN IOT TECHNOLOGY CO., LTD., Sichuan (CN)

(72) Inventor: Hanshu Shao, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 18/811,741

(22) Filed: Aug. 21, 2024

(65) Prior Publication Data

US 2024/0409316 A1     Dec. 12, 2024

(30) Foreign Application Priority Data

Jun. 26, 2024   (CN) .......................... 202410832665.2

(51) Int. Cl.
G06F 7/00       (2006.01)
B65G 1/137      (2006.01)
(Continued)

(52) U.S. Cl.
CPC ........... B65G 1/1378 (2013.01); G06N 20/00 (2019.01); G06Q 10/087 (2013.01)

(58) Field of Classification Search
CPC ...... B65G 1/1378; B65G 1/04; B65G 1/1373; G06N 20/00; G06Q 10/087; G06Q 10/04;
(Continued)

(56) References Cited

U.S. PATENT DOCUMENTS

| 10,527,428 B1* | 1/2020 | Mehta | ................. G05D 1/0027 |
| 2020/0290805 A1* | 9/2020 | Otto | ..................... B65G 1/0492 |

(Continued)

FOREIGN PATENT DOCUMENTS

| CN | 108960519 A | 12/2018 |
| CN | 111781927 A | 10/2020 |

(Continued)

OTHER PUBLICATIONS

Qi, Heng, Design of Logistics Warehouse Management System Based on Internet of Things, Experimental Technology and Management, 30(12): 133-135, 2013.

(Continued)

*Primary Examiner* — Yolanda R Cumbess
(74) *Attorney, Agent, or Firm* — Porus IP LLC

(57) ABSTRACT

A control method, system, and equipment for handling equipment based on an industrial Internet of things (IoT). The method includes: obtaining cargo handling information for cargo to be handled; determining a handling area for the cargo to be handled based on the cargo handling information; obtaining handling equipment information in the handling area; determining target handling equipment within the handling area based on the cargo handling information and the handling equipment information; obtaining target handling equipment information of the target handling equipment; determining a handling parameter of the target handling equipment based on the cargo handling information and the target handling equipment information; generating a handling instruction based on the handling area and the handling parameter, and controlling the target handling equipment; and generating an update instruction in response to each of the target handling equipment completing each handling, updating and displaying a working status of the target handling equipment.

9 Claims, 12 Drawing Sheets

(51) Int. Cl.
  *G06N 20/00* (2019.01)
  *G06Q 10/087* (2023.01)
(58) Field of Classification Search
  CPC ............ G06Q 10/047; G06Q 10/06313; Y02P 90/02; G16Y 20/10; G16Y 20/20; G16Y 40/10; G16Y 40/20; G16Y 40/35; H04L 67/125
  USPC .......................................... 700/213–216, 228
  See application file for complete search history.

(56) References Cited

U.S. PATENT DOCUMENTS

| | | | |
|---|---|---|---|
| 2021/0339953 A1* | 11/2021 | Otto | ............ B65G 1/1378 |
| 2023/0418262 A1 | 12/2023 | Shao et al. | |
| 2024/0043214 A1 | 2/2024 | Shao et al. | |

FOREIGN PATENT DOCUMENTS

| | | | | |
|---|---|---|---|---|
| CN | 112162557 A | | 1/2021 | |
| CN | 112265006 A | | 1/2021 | |
| CN | 112465434 A | * | 3/2021 | |
| CN | 112529611 A | * | 3/2021 | ......... G06Q 30/0271 |
| CN | 113112209 A | | 7/2021 | |
| CN | 110550359 B | * | 10/2021 | ........... B65G 1/0492 |
| CN | 114493156 A | | 5/2022 | |
| CN | 114919918 A | | 8/2022 | |
| CN | 116330322 A | | 6/2023 | |
| CN | 116452099 A | | 7/2023 | |
| CN | 116902449 A | | 10/2023 | |
| CN | 116957298 A | | 10/2023 | |
| CN | 117097776 A | | 11/2023 | |
| CN | 117383129 A | | 1/2024 | |

OTHER PUBLICATIONS

First Office Action in Chinese Application No. 202410832665.2 mailed on Aug. 1, 2024, 21 pages.

Notification to Grant Patent Right for Invention in Chinese Application No. 202410832665.2 mailed on Aug. 30, 2024, 5 pages.

* cited by examiner

600

```
┌─────────────────────────────────────┐
│ Determining a plurality of candidate│
│ handling routes based on the warehouse│
│ map, the starting positions, and the│──── S610
│ ending positions of the plurality of the│
│ cargo to be handled                 │
└─────────────────────────────────────┘
                  ↓
┌─────────────────────────────────────┐
│ Determining a conflict interval based on│
│ the plurality of the candidate handling│
│ routes, the cargo handling information for│──── S620
│ the plurality of the cargo to be handled,│
│ and the handling equipment information│
│ within the handling area            │
└─────────────────────────────────────┘
                  ↓
┌─────────────────────────────────────┐
│ Determining an alternate interval based on│
│ the conflict interval, the warehouse map,│──── S630
│ and the plurality of the candidate handling│
│ routes                              │
└─────────────────────────────────────┘
                  ↓
┌─────────────────────────────────────┐
│ Determining a plurality of optimal  │
│ handling routes based on the alternate│──── S640
│ interval, the conflict interval, and the│
│ plurality of candidate handling routes│
└─────────────────────────────────────┘
```

FIG. 6

CONTROL METHODS, SYSTEMS, AND EQUIPMENT FOR HANDLING EQUIPMENT BASED ON INDUSTRIAL INTERNET OF THINGS

CROSS-REFERENCE TO RELATED APPLICATION

This application claims priority to Chinese application No. 202410832665.2 filed on Jun. 26, 2024, the entire contents of which are incorporated herein by reference.

TECHNICAL FIELD

The present disclosure relates to the field of Internet of Things (IoT) technology, and in particular relates to a control method, system, and equipment for handling equipment based on an industrial IoT.

BACKGROUND

In industrial production, warehouses usually store a variety of cargo, such as various materials required for production, various consumables required by a factory on a daily basis, or various products produced. In some great warehouses, the type of cargo stored is usually more varied, and a number of cargo is great. The cargo is usually handled from one area to another on a regular basis during a daily cargo management process. At present, the handling of the cargo in the warehouse is usually achieved through a manual operation of handling equipment, which is time-consuming and effort consuming, the handling of cargo is less efficient, and it is easy to make mistakes during the handling process, which makes it difficult to meet complex and diverse requirements of modern warehousing and handling control operation.

Therefore, it is desired to provide a control method, system, and equipment for handling equipment based on an industrial Internet of things (IoT). By combining the industrial IoT with the use of handling equipment for handling cargo, it not only makes the process of handling the cargo more time-saving and labor-saving, improves the efficiency of the cargo handling, but also reduces a probability of errors in the handling process, which is able to be applied to the scenario of complexity and diversification of warehousing operations and handling control operations and satisfies the requirements of the cargo handling in great warehouses.

SUMMARY

One or more embodiments of the present disclosure provide a control method for handling equipment based on an industrial internet of things (IoT) used in an industrial IoT system. The industrial IoT system includes a management platform. The method is executed by the management platform, and the method includes: obtaining cargo handling information for cargo to be handled; determining a handling area for the cargo to be handled based on the cargo handling information; obtaining handling equipment information in the handling area; determining target handling equipment within the handling area based on the cargo handling information and the handling equipment information; and a type of the target handling equipment within the same the handling area is the same; obtaining target handling equipment information for the target handling equipment in the handling area; the target handling equipment information including a load rating, a handling speed, a handling distance, and a number of the target handling equipment; determining a handling parameter of the target handling equipment in the handling area based on the cargo handling information and the target handling equipment information; the handling parameter including a handling volume and an optimal number of jobs; generating a handling instruction based on the handling area and the handling parameter, and controlling the target handling equipment in the handling area based on the handling instruction to handle the cargo to be handled from a current handling area of the target handling equipment to a next handling area; and generating an update instruction in response to each of the target handling equipment completing each handling, updating and displaying a working status of the target handling equipment based on the update instruction; the working status at least including a handled volume, a volume to be handled, and an equipment status of the target handling equipment.

One of the embodiments of the present disclosure provides a control system for handling equipment based on an industrial Internet of things (IoT) including a management platform, the management platform being configured with: a handling area generation module configured to obtain cargo handling information of cargo to be handled; and determine a handling area of the cargo to be handled based on the cargo handling information; a handling equipment generation module configured to obtain handling equipment information within the handling area; and determine target handling equipment within the handling area based on the cargo handling information and the handling equipment information, the target handling equipment in the same handling area being at least one handling equipment of a same type; a handling parameter calculation module configured to obtain target handling equipment information of the target handling equipment within the handling area, the target handling equipment information including a load rating, a handling speed, a handling distance, and a number of the target handling equipment; and determine a handling parameter of the target handling equipment within the handling area based on the cargo handling information and the target handling equipment information; the handling parameter including a handling volume and an optimal number of jobs; a handling control module configured to generate a handling instruction based on the handling area and the handling parameter, and control the target handling equipment in the handling area based on the handling instruction to handle the cargo to be handled from a current handling area of the target handling equipment to the next handling area; and a working status update module configured to generate an update instruction in response to each of the target handling equipment completing each handling, update and display a working status of the target handling equipment based on the update instruction; the working status at least including a handled volume, a volume to be handled, and an equipment status of the target handling equipment.

One or more embodiments of the present disclosure provide a computer equipment including a memory and a processor. The memory is stored with a computer program runnable on the processor, and the processor executes the computer program to implement the aforementioned Industrial IoT method of controlling handling equipment.

BRIEF DESCRIPTION OF THE DRAWINGS

The present disclosure is further described in terms of exemplary embodiments. These exemplary embodiments are described in detail with reference to the drawings. The drawings are not to scale. These embodiments are nonlimiting exemplary embodiments, in which like reference numerals indicate similar structures throughout the several views of the drawings, and wherein:

FIG. 6 is a flowchart illustrating an exemplary manner for determining an optimal handling route according to some embodiments of the present disclosure;

DETAILED DESCRIPTION

Figure 1:
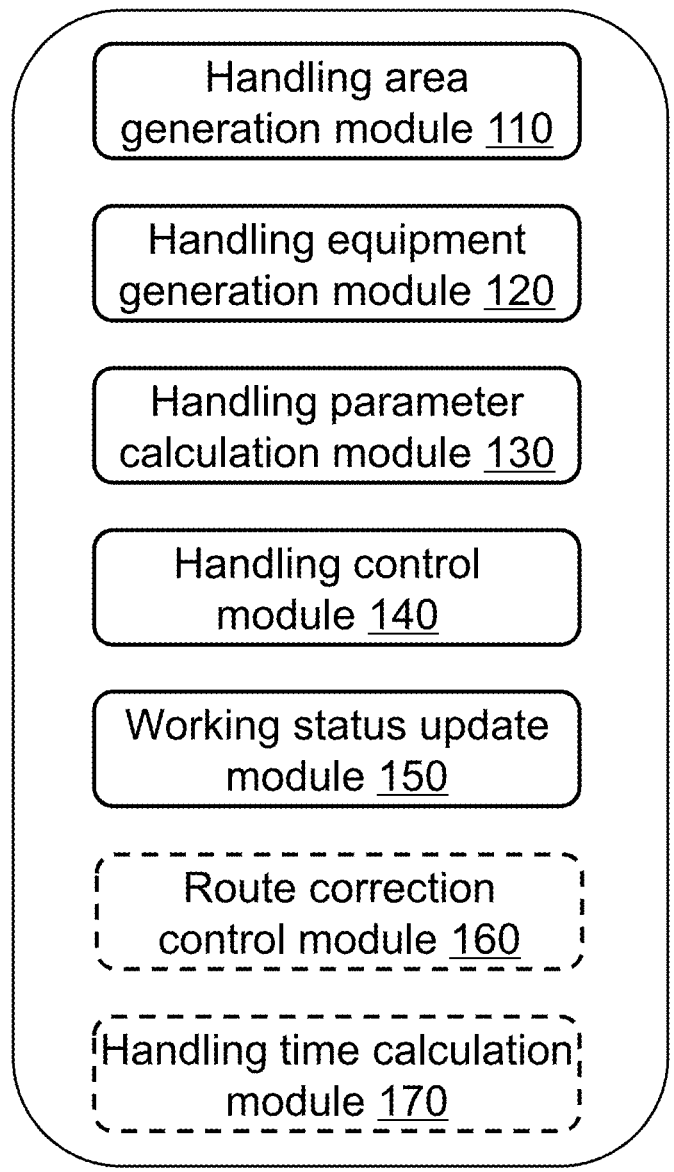
FIG. 1 is an exemplary module diagram illustrating a control system for handling equipment based on an industrial internet of things (IoT) according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "equipment," "unit" and/or "module" as used herein are a way to distinguish between different components, elements, parts, sections, or assemblies at different levels. However, if other words accomplish the same purpose, said words may be replaced by other expressions.

As shown in the present disclosure and in the claims, unless the context clearly suggests an exception, the words "one," "a," "an," and/or "the" do not refer specifically to the singular, but may also include the plural. Generally, the terms "including" and "comprising" suggest only the inclusion of clearly identified steps and elements that do not constitute an exclusive list, and the method or equipment may also include other steps or elements.

Flowcharts are used in the present disclosure to illustrate operations performed by a system in accordance with embodiments of the present disclosure. It should be appreciated that the preceding or following operations are not necessarily performed in an exact sequence. Instead, steps may be processed in reverse order or simultaneously. Also, it is possible to add other operations to these processes or remove a step or steps from these processes.

FIG. 1 is an exemplary module diagram illustrating a control system for handling equipment based on an industrial internet of things (IoT) according to some embodiments of the present disclosure.

Some embodiments of the present disclosure provide a control system for handling equipment based on an industrial IoT 100 (hereinafter referred to as a control system 100). As shown in FIG. 1, the control system 100 may include a handling area generation module 110, a handling equipment generation module 120 (which may also be referred to as a target handling equipment generation module), a handling parameter calculation module 130, a handling control module 140, and a working status update module 150. In some embodiments, the handling area generation module 110, the handling equipment generation module 120, the handling parameter calculation module 130, the handling control module 140, and the working status update module 150 are all communicatively coupled to each other. Exemplary communication connections include, but are not limited to, Bluetooth, WIFI, 5G, etc.

In some embodiments, the handling area generation module 110, the handling equipment generation module 120, the handling parameter calculation module 130, the handling control module 140, and the working status update module 150 may have their own processors, or may share a common processor.

The processor may process data and/or information obtained from other equipment or system components. The processor may execute program instructions based on such data, information, and/or processing results to perform one or more functions described in the present disclosure. In some embodiments, the processor may include one or more sub-processing equipment (e.g., a single-core processing equipment or a multi-core processing equipment). Merely by way of example, the processor may include a central processing unit (CPU), a controller, a microprocessor, etc., or any combination of the above.

The handling area generation module 110 may be configured to obtain cargo handling information of cargo to be handled and, and determine, based on the cargo handling information, a handling area of the cargo to be handled. The handling area refers to each area that the cargo to be handled passes through sequentially during a handling process.

In some embodiments, the handling area generation module 110 may include a scanning equipment. The scanning equipment may obtain the cargo handling information for the cargo to be handled by scanning a barcode, a QR code, or an RFID tag, etc., of the cargo to be handled. Exemplary scanning equipment may include scanners, etc.

In some embodiments, the handling area generation module 110 may be further configured to determine, based on the cargo handling information, a starting position and an ending position of the cargo to be handled; obtain a warehouse map; determine an optimal handling route based on the warehouse map, the starting position, and the ending position of the cargo to be handled; and determine the handling area of the cargo to be handled based on the optimal handling route and the warehouse map.

In some embodiments, the handling area generation module 110 may further include a collection equipment. The collection equipment may be used to collect warehouse spatial data to obtain the warehouse map. Exemplary collection equipment may include automated guided vehicles (AGVs), drones, etc.

The handling equipment generation module 120 may be configured to obtain handling equipment information within the handling area and to determine target handling equipment within the handling area based on the cargo handling information and the handling equipment information. The target handling equipment within the same handling area is at least one handling equipment of the same type.

In some embodiments, the handling equipment generation module 120 may include a sensor element. The sensor element may be mounted on the handling equipment for obtaining the handling equipment information in the handling area. For example, the sensor element may be a speed sensor for collecting a vehicle speed of the handling equipment.

The handling parameter calculation module 130 may be configured to obtain target handling equipment information of the target handling equipment in the handling area, the target handling equipment information including a load rating, a handling speed, a handling distance and a number of the target handling equipment; determine, based on the cargo handling information and the target handling equipment information, a handling parameter of the target handling equipment in the handling area, the handling parameter including a handling volume and an optimal number of jobs.

The handling control module 140 may be configured to generate a handling instruction based on the handling area and the handling parameter, and to control the target handling equipment in the handling area based on the handling instruction to handle the cargo to be handled from a current handling area of the target handling equipment to a next handling area.

The working status update module 150 may be configured to generate an update instruction in response to each target handling equipment completing each handling, update and display a working status of the target handling equipment based on the update instruction. The working status includes at least a handled volume, a volume to be handled, and an equipment status of the target handling equipment.

In some embodiments, the control system 100 may further include a route correction control module 160 and a handling time calculation module 170. In some embodiments, the route correction control module 160 and the handling time calculation module 170 are both communicatively connected to the aforementioned handling area generation module 110, the handling equipment generation module 120, the handling parameter calculation module 130, the handling control module 140, and the working status update module 150. In some embodiments, the route correction control module 160 and the handling time calculation module 170 may also have their own processors or share a processor with other modules.

The route correction control module 160 may be configured to, during a process of handling the cargo to be handled by the target handling equipment, for each of the target handling equipment, obtain a current position of the target handling equipment at a preset collection frequency; determine whether the target handling equipment is located on the optimal handling route based on the current position; in response to that the target handling equipment is not located on the optimal handling route, generating a route correction instruction and controlling the target handling equipment to perform a route correction as well as a position information acquisition based on the route correction instruction; the route correction instruction including updating a route and updating a collection frequency.

The handling time calculation module 170 may be configured to determine a cargo number of the cargo to be handled based on the cargo handling information; calculate a predicted handling time based on the cargo number of the cargo to be handled, the optimal number of jobs of the target handling equipment in the handling area, and the handling volume; and displaying the predicted handling time.

For more contents about the handling area generation module, the handling equipment generation module, the handling parameter calculation module, the handling control module, the working status update module, the route correction control module, and the handling time calculation module, please refer to the relevant descriptions in the subsequent sections (e.g., FIGS. 4-12).

It should be noted that the above description of the control system for handling equipment based on an industrial IoT and the modules thereof is provided only for descriptive convenience, and does not limit the present disclosure to the scope of the cited embodiments. It is to be understood that for those skilled in the art, after understanding the principle of the system, it is possible to arbitrarily combine the individual modules or form a sub-system to be connected to the other modules without departing from this principle. In some embodiments, the handling area generation module 110, the handling equipment generation module 120, the handling parameter calculation module 130, the handling control module 140, the working status update module 150, the route correction control module 160, and the handling time calculation module 170 may be different modules in a single system, or a single module realizing the functions of two or more of the above-described modules. For example, the individual modules may share a common storage module, and the individual modules may each have a respective storage module. Morphs such as these are within the scope of protection of the present disclosure.

Figure 2:
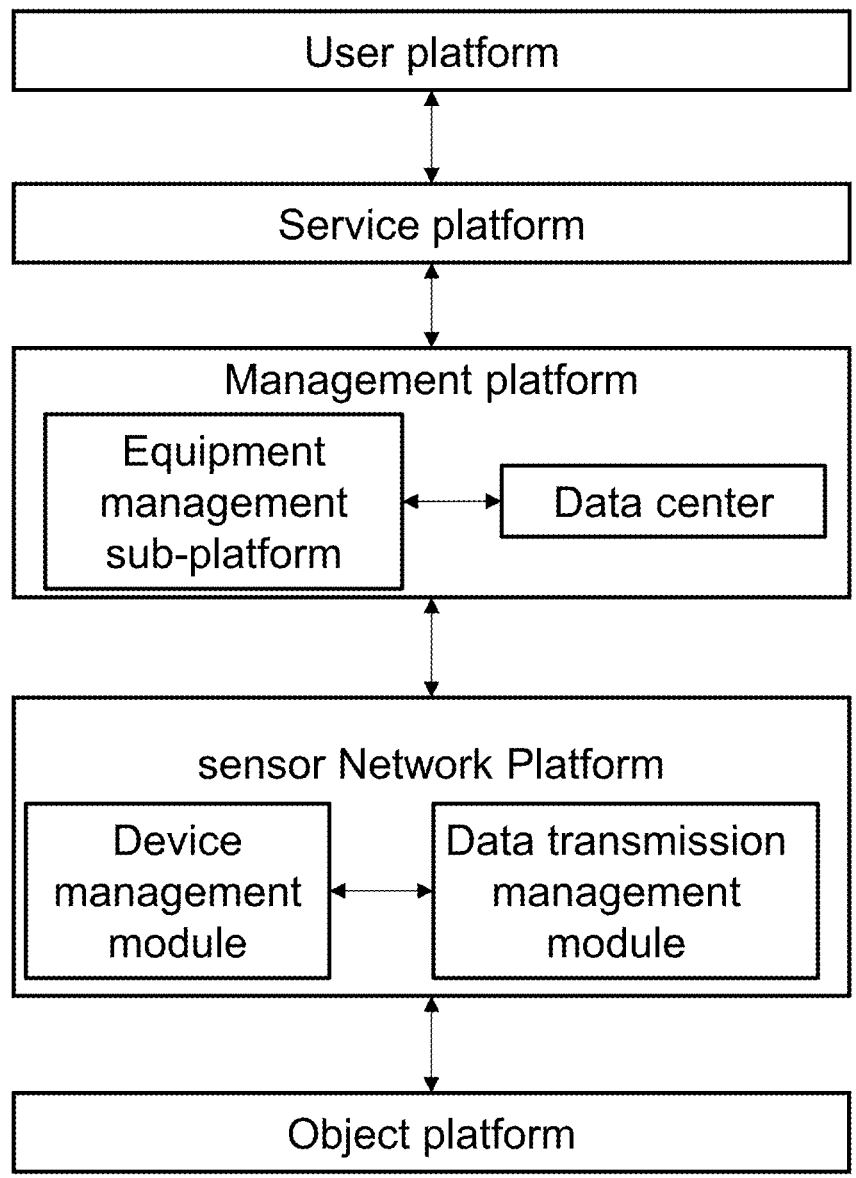
FIG. 2 is a schematic diagram illustrating an overall process of an application scenario of an industrial IoT system provided by a control system for handling equipment based on an industrial IoT according to some embodiments of the present disclosure.
Figure 3:
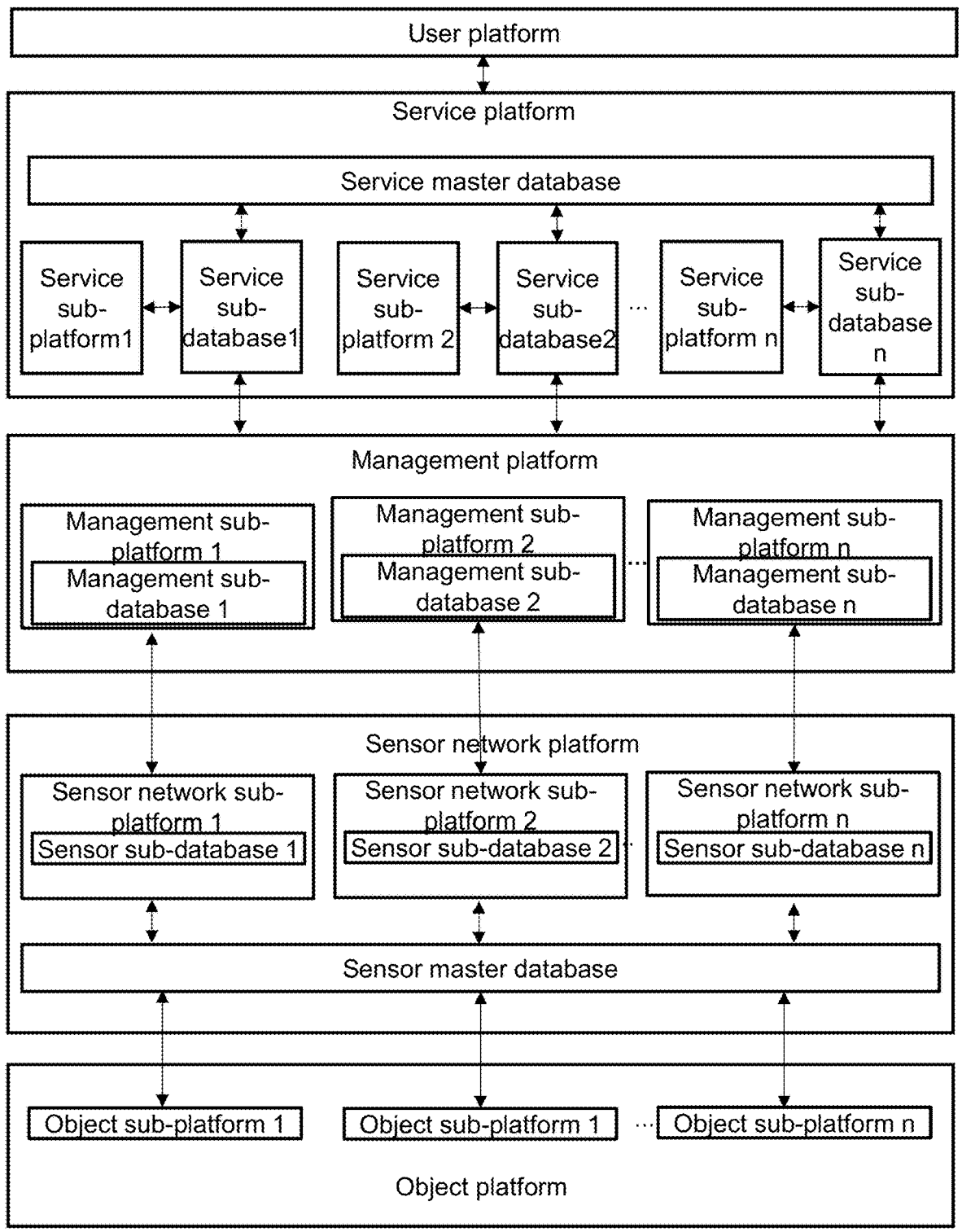
FIG. 3 is a schematic diagram illustrating a specific process of an application scenario of an industrial IoT system provided by a control system for handling equipment based on an industrial IoT according to some embodiments of the present disclosure.

FIG. 2 is a schematic diagram illustrating an overall process of an application scenario of an industrial IoT system provided by a control system for handling equipment based on an industrial IoT according to some embodiments of the present disclosure; and FIG. 3 is a schematic diagram illustrating a specific process of an application scenario of an industrial IoT system provided by a control system for handling equipment based on an industrial IoT according to some embodiments of the present disclosure.

As shown in FIG. 2, an industrial IoT system 200 provided by the control system for handling equipment based on the industrial internet of things (IoT) may include a user platform, a service platform, a management platform, a sensor network platform, and an object platform interacting sequentially, forming a basic five-platform framework. The user platform includes a number of user terminals; the service platform includes a number of application function entities; the management platform includes an equipment management sub-platform and a data center, and the equipment management sub-platform may interact with the data center; the sensor network platform includes an equipment management module and a data transmission management module, and the equipment management module may interact with the data transmission management module. Through the interaction between the various functional platforms of the industrial IoT system based on the above five platforms, a perfect closed-loop information operation logic is established to ensure an orderly operation of the sensor information and the controlling information, so as to realize an intelligent management of the equipment.

Further, as shown in FIG. 3, according to some embodiments of the present disclosure, the industrial IoT system includes an object platform, a sensor network platform, a management platform, a service platform, and a user platform.

The user platform is configured as a plurality of terminal equipment. Exemplary terminal equipment may include a smart electronic equipment capable of data processing as well as data communication such as desktop computers, tablets, laptops, cell phones, or consoles. In some embodiments, the terminal equipment in the user platform is configured to perform functions of the user terminal in any of the manners described below.

In some embodiments, the user platform may be configured to receive and display a working status and a predicted handling time of target handling equipment delivered by the service platform. In some embodiments, the user platform may also enable the input of data and/or information. For example, a user (e.g., a manager) may manually enter cargo handling information about cargo to be handled, handling equipment information in a handling area, etc. through the user platform.

The service platform is configured to be an application programming interface (API) server or other server used to establish communication between the management platform and the user platform to implement the corresponding functionality. In some embodiments, the service platform may include a number of application functional entities.

In some embodiments, the service platform may be used to receive the working status and the predicted handling time of the target handling equipment communicated by the management platform and communicate the working status and the predicted handling time to the user platform. In some embodiments, the service platform may also be used to receive information uploaded by the user platform such as the cargo handling information of the cargo to be handled, the handling equipment information in the handling area, and pass the above information to the management platform.

In some embodiments, the service platform includes a service master database in communication with the management platform, at least one service sub-platform in communication with the service master database and the user platform, and the service sub-platform includes the service sub-database. Each service sub-platform corresponds to an API function or an API server. Specifically, the service platform includes the service master database that communicates with the management platform, n numbers of service sub-platforms that communicate with the service master database and the user platform, each of which includes the service sub-database.

The management platform refers to a platform for an integrated management of the handling equipment, etc. In some embodiments, the management platform may include the equipment management sub-platform and the data center, and the management platform is configured to: obtain the cargo handling information of the cargo to be handled; determine, based on the cargo handling information, a handling area of the cargo to be handled; obtain the handling equipment information within the handling area; determine, based on the cargo handling information and the handling equipment information, the target handling equipment within the handling area; obtain target handling equipment information of the target handling equipment within the handling area; determine, based on the cargo handling information and the target handling equipment information, a handling parameter of the target handling equipment within the handling area; generate, based on the handling area and the handling parameter, the handling instruction, and control the target handling equipment in the handling area based on the handling instruction to handle the cargo to be handled from a current handling area of the target handling equipment to the next handling area; and generate an update instruction in response to each of the target handling equipment completing each handling, update and display a working status of the target handling equipment based on the update instruction.

The sensor network platform, configured as a communication network and a gateway, is used to receive relevant data and/or information obtained by the object platform (e.g., the cargo handling information of the cargo to be handled, the handling equipment information in the handling area, etc.) and transmit the data and/or information to the management platform.

In some embodiments, the sensor network platform includes a sensor master database in communication with the management platform and at least one sensor network sub-platform in communication with the sensor master database and the object platform. The sensor network sub-platform includes a sensor sub-database. Each of the sensor network sub-platforms corresponds to one communication network and gateway. Specifically, the sensor network platform includes the sensor master database in communication with the management platform, and n numbers of sensor network sub-platforms in communication with the sensor master database and the object platform. Each sensor network sub-platform includes the sensor sub-database.

The object platform may be used to collect equipment parameters. In some embodiments, the object platform may be used to obtain information related to the cargo to be handled, the handling equipment, or the handling area, for example, the cargo handling information for the cargo to be handled, the handling equipment information in the handling area, a warehouse map, etc.

In some embodiments, the object platform may include a plurality of object sub-platforms. The object platform may include a plurality of the sensor elements including, but not limited to, speed sensors, position sensors, etc. In some embodiments, the corresponding platform may also include other equipment such as scanning equipment, collection equipment, etc.

For more contents on the scanning equipment, the collection equipment, please refer to FIG. 1 and the related descriptions.

The control system for handling equipment based on the industrial IoT provided in some embodiments of the present disclosure is capable of realizing any one of the methods in the control method for handling equipment based on the industrial IoT, and for a specific working process of the control system for handling equipment based on the industrial IoT provided in some embodiments of the present disclosure, please refer to the corresponding process in the control method for handling equipment based on an industrial IoT described above.

Figure 4:
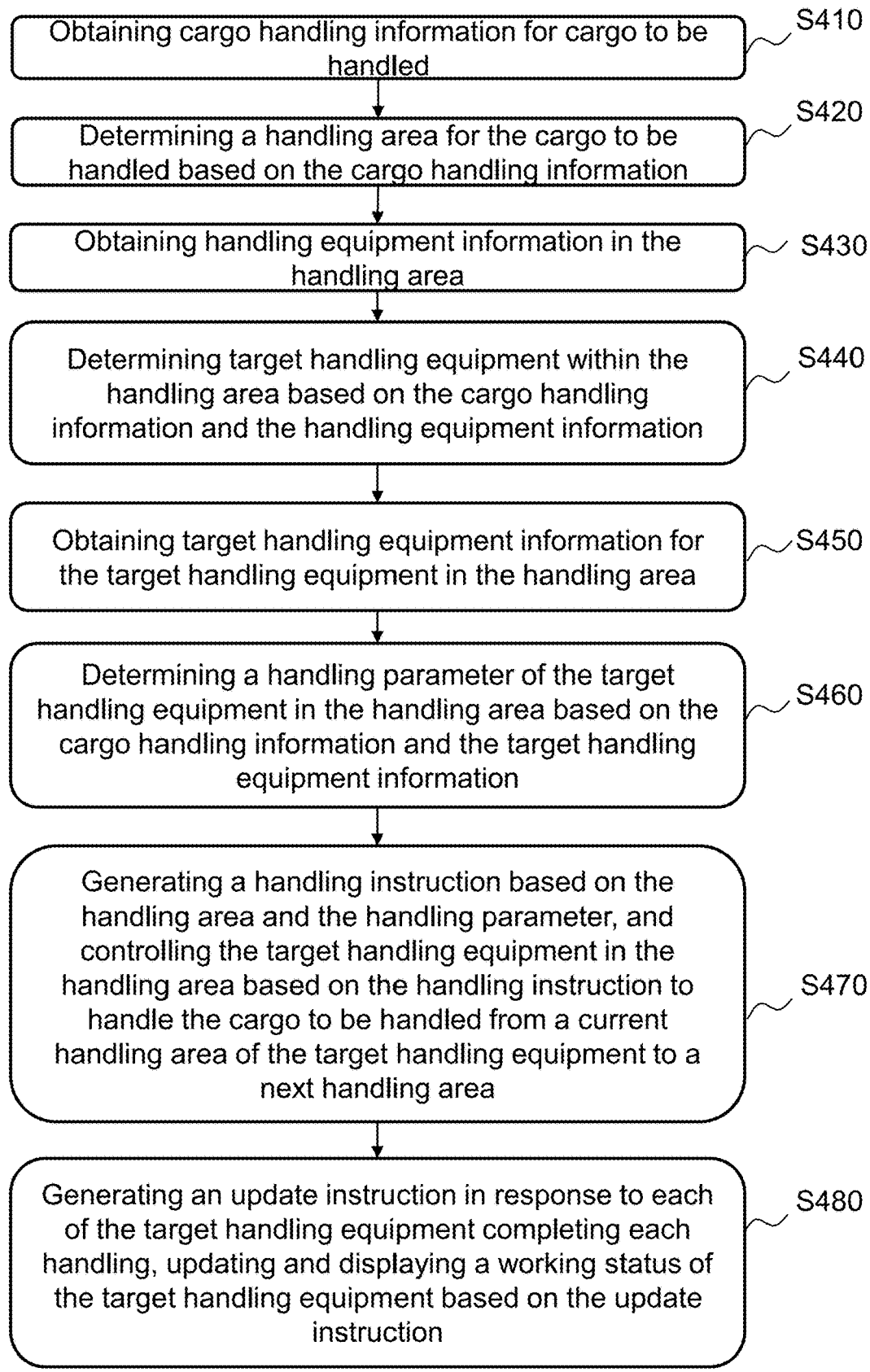
FIG. 4 is a flowchart illustrating an exemplary control method for handling equipment based on an industrial IoT according to some embodiments of the present disclosure.

FIG. 4 is a flowchart illustrating an exemplary control method for handling equipment based on an industrial IoT according to some embodiments of the present disclosure. As shown in FIG. 4, a process 400 includes the following steps. In some embodiments, the process 400 may be performed by a management platform.

S410, obtaining cargo handling information for cargo to be handled.

The cargo to be handled refers to cargo or an item to be handled within a warehouse. For example, the cargo to be handled may include various materials required for production, various consumables required by the factory on a daily basis, or various products produced, etc. The cargo handling information of the cargo to be handled refers to relevant information that reflects features of the cargo to be handled. In some embodiments, the cargo handling information of the cargo to be handled includes handling information such as a type or a specification of the cargo to be handled, a starting position, an ending position, a weight of the cargo, etc.

In some embodiments, the management platform may obtain the cargo handling information for the cargo to be handled through manual input by staff and/or automatic scanning. For example, the management platform may scan a barcode, a QR code, or a radio frequency identification (RFID) tag of the cargo to be handled by a scanning equipment (e.g., a scanner, etc.) to obtain the handling information such as the type or specification of the cargo to be handled and the weight of the cargo. For another example, the management platform may obtain the cargo handling information, such as the starting position and the ending position of the cargo to be handled, through manual input by a staff member.

S420, determining a handling area for the cargo to be handled based on the cargo handling information.

The handling area of the cargo to be handled refers to an area through which the cargo to be handled passes in a handling process. It should be noted that in a great warehouse, the warehouse is usually divided into different areas according to a storage requirement, and two areas may store the same cargo, or different cargo, and layouts of the different areas are usually different, for example, a road in one area is wider, and the road in an area adjacent to the area is narrower.

In some embodiments, the management platform may determine, based on the cargo handling information, various regions involved in a line connecting the starting position of the cargo to be handled and the ending position of the cargo to be handled as the handling area of the cargo to be handled.

Figure 5:
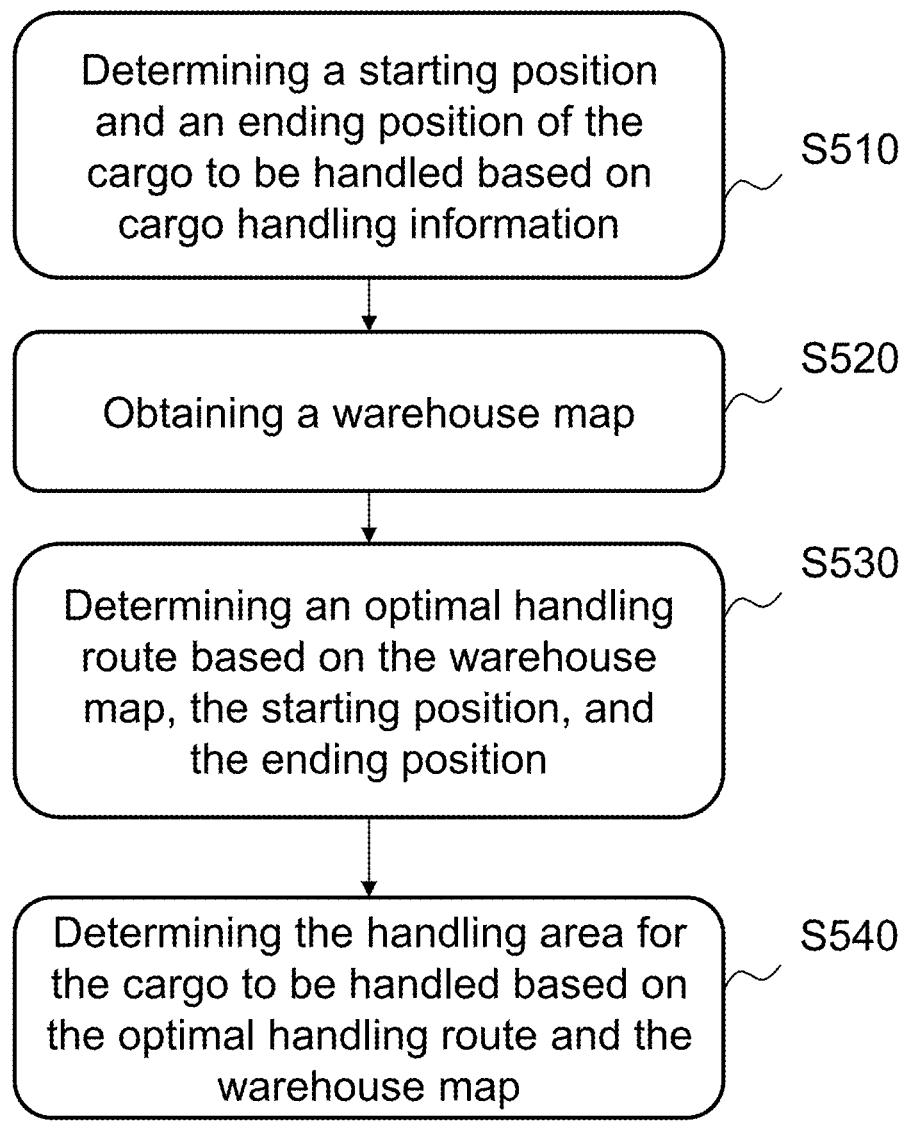
FIG. 5 is a flowchart illustrating an exemplary manner for determining a handling area for cargo to be handled according to some embodiments of the present disclosure.

For more contents on how the management platform determines the handling area of the cargo to be handled based on the cargo handling information, please refer to FIG. 5 and the related descriptions.

S430, obtaining handling equipment information in the handling area.

The handling equipment information in the handling area refers to relevant information that reflects the features of the handling equipment in each handling area. The handling equipment information includes a basic parameter of the handling equipment, such as a type of the handling equipment, a load rating of the handling equipment, a size of the handling equipment, a battery capacity of the handling equipment, a speed of the handling equipment, an equipment status of the handling equipment, and other relevant parameters.

It should be noted that the type of the handling equipment in the same handling area may be the same or different, i.e., the handling equipment in the same handling area may belong to the same type of handling equipment, or the handling equipment in the same handling area may be of different types. For example, there is only one type of handling equipment A in a handling area X1, and there are two types of handling equipment A and C in a handling area X2. However, the same type of handling equipment in the same handling area are usually only used to handle one cargo type, and one cargo type is usually only handled with one type of handling equipment in one handling area. For example, there are only two types of handling equipment, A and B, in the handling area X1, and the handling equipment of type A may only be used to handle cargo of type Y1, and the handling equipment of type B may only be used to handle cargo of type Y2.

In some embodiments, the management platform may scan the barcode, the QR codes, or the RFID tag, etc. of the handling equipment by the scanning equipment (e.g., the scanner, etc.) to obtain the handling equipment information in the handling area, such as the type or specification of the handling equipment, the load rating of the handling equipment, the size of the handling equipment, the battery capacity of the handling equipment, etc. In some embodiments, the management platform may also obtain the handling equipment information in the handling area, such as the vehicle speed of the handling equipment, by means of a sensor element (e.g., a speed sensor) mounted on the handling equipment. In some embodiments, the handling equipment information in the handling area may also be obtained by manual input from the staff member.

S440, determining target handling equipment within the handling area based on the cargo handling information and the handling equipment information.

The target handling equipment within the handling area refers to the handling equipment required to move the cargo to be handled within each handling area. The target handling equipment within the same handling area refers to at least one handling equipment of the same type.

In some embodiments, the target handling equipment in the same handling area may include a plurality of the same type of handling equipment, i.e., there are a plurality of target handling equipment in the same handling area that are of the same type. For example, there are two types of handling equipment, A and B, in the handling area X1, and the target handling equipment of the handling area X1 is all the handling equipment belonging to type A in the handling area X1. And as handling environments of different handling areas may be different, for example, a height of the road and a width of the road in different handling areas are not the same, the types of the handling equipment in the different handling areas may be the same, or may be different. For example, there are two types of handling equipment A and B in the handling area X1, two types of handling equipment C and D in the handling area X2, two types of handling equipment A and B in the handling area X3, and two types of handling equipment A and C in the handling area X4.

In some embodiments, the management platform may determine, based on the cargo handling information and the handling equipment information, the target handling equipment within the handling area through a preset table. The preset table may be used to indicate a correlation between the cargo type of the cargo to be handled and the handling area and the type of handling equipment within the handling area. Corresponding types of handling equipment exist for each type of the cargo to be handled in different handling areas. In some embodiments, the preset table may be constructed based on the cargo type of a historical cargo to be handled, a historical handling area, and a historical handling equipment type.

S450, obtaining target handling equipment information for the target handling equipment in the handling area.

The target handling equipment information refers to information related to the target handling equipment. In some embodiments, the target handling equipment information includes the load rating, a handling speed, a handling distance, and a number of the target handling equipment.

In some embodiments, the management platform may screen from the handling equipment information to obtain the target handling equipment information, such as the load rating, and the number of the target handling equipment based on the handling equipment information in the handling area. In some embodiments, the management platform may obtain the target handling equipment information, such as the handling speed, the handling distance of the target handling equipment, by means of the sensor element (e.g., the speed sensor, a displacement sensor), etc. In some embodiments, the target handling equipment information may also be obtained by manual input by a staff member.

S460, determining a handling parameter of the target handling equipment in the handling area based on the cargo handling information and the target handling equipment information.

The handling parameter of the target handling equipment refers to a relevant parameter that reflects a handling capability, etc. of the target handling equipment. In some embodiments, the handling parameter includes a handling volume and an optimal number of jobs.

The handling volume refers to a maximum handling weight that is carried by a single target handling equipment in a single handling. The optimal number of jobs refers to an actual number of the target handling equipment involved in the handling. It is understood that the optimal number of jobs for the target handling equipment in each handling area is less than or equal to a number of the target handling equipment in the corresponding handling area.

In some embodiments, the management platform may determine, based on the cargo handling information and the target handling equipment information, the handling parameter of the target handling equipment in the handling area by a parameter preset table. The parameter preset table may reflect a correlation between the cargo handling information, the target handling equipment, and the handling parameter of the target handling equipment. In some embodiments, the parameter preset table may be constructed based on historical cargo handling information, historical target handling equipment, and an actual handling parameter of the historical target handling equipment.

Figure 11:
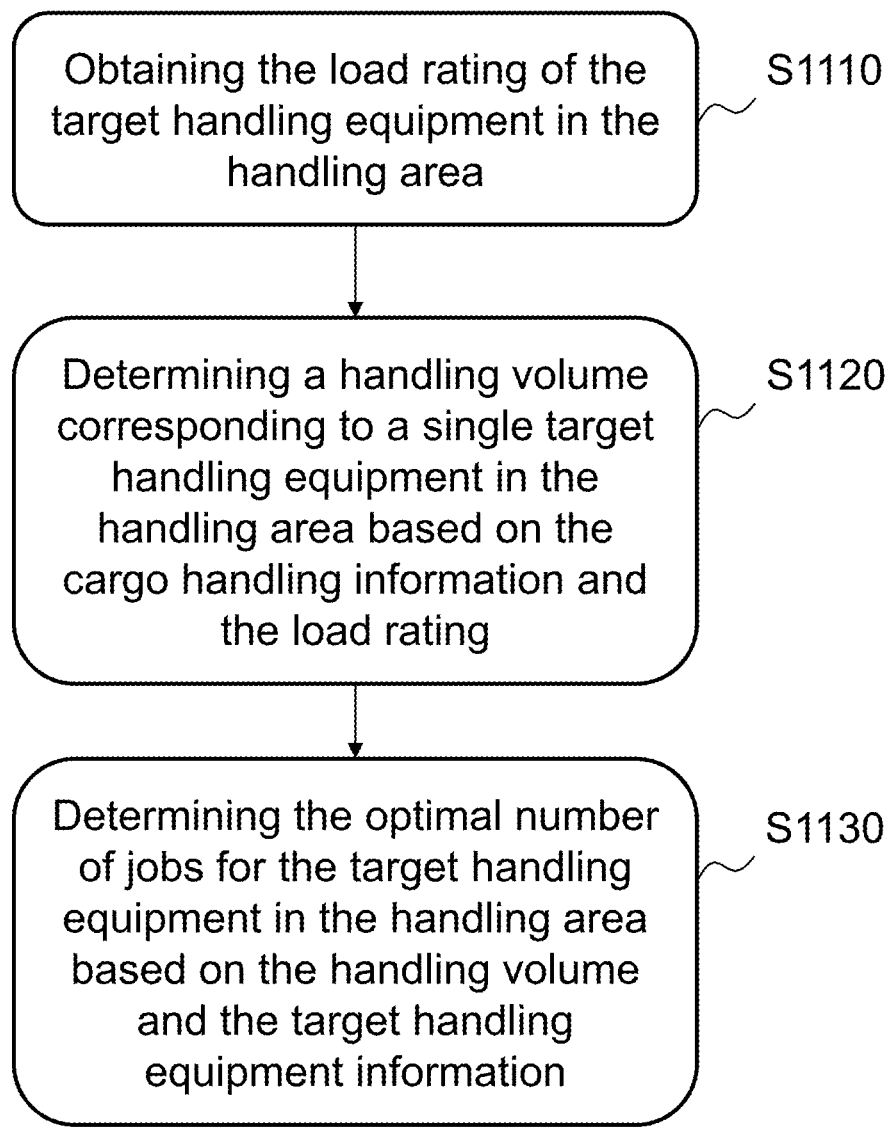
FIG. 11 is a flowchart illustrating an exemplary manner for determining a handling parameter according to some embodiments of the present disclosure.

For more contents on how the management platform determines the handling parameter of the target handling equipment in the handling area based on the cargo handling information and the target handling equipment information, please refer to FIG. 11 and the related descriptions.

S470, generating a handling instruction based on the handling area and the handling parameter, and controlling the target handling equipment in the handling area based on the handling instruction to handle the cargo to be handled from a current handling area of the target handling equipment to a next handling area.

A handling instruction refers to an instruction related to controlling the target handling equipment in the handling area. In some embodiments, the handling instruction may include information such as a handling start signal, the handling volume, the optimal number of jobs, the handling area, etc.

In some embodiments, the management platform may automatically generate, based on the handling area and the handling parameter, the handling instruction through a program logic by executing a preset program code, and send the handling instruction to the target handling equipment within the handling area. When the target handling equipment in the handling area receives the handling instruction, it instantly executes the handling instruction so as to handle the cargo to be handled from the current handling area of the target handling equipment to the next handling area.

S480, generating an update instruction in response to each of the target handling equipment completing each handling, updating and displaying a working status of the target handling equipment based on the update instruction.

The completing each handling refers to that the target handling equipment moves a portion of the cargo to be handled from the current handling area of that target handling equipment to the next handling area.

The update instruction refers to an instruction for updating the working status of the target handling equipment. The working status of the target handling equipment includes, but is not limited to, a handled volume, a volume to be handled, an equipment status of the target handling equipment, etc.

The handled volume of the target handling equipment refers to a total weight (or total number) of the cargo to be handled that is moved by each target handling equipment. The volume to be handled of the target handling equipment refers to the total weight (or total number) of the cargo to be handled that is not yet handled, i.e. the total weight (or total number) of all remaining cargo to be handled. Understandably, after each target handling equipment completing each handling, the volume to be handled of all target handling equipment needs to be updated, and the volume to be handled of all target handling equipment are the same. The equipment status of the target handling equipment refers to a status of the target handling equipment itself. For example, the equipment status may include a power level, a range time, an abnormality detection status (e.g., whether a motor is abnormal, whether a sensor is abnormal, etc.), a real-time speed, an idle-busy status, etc.

In some embodiments, in response to each of the target handling equipment completing each handling, the management platform may automatically generate the update instruction based on the program logic by executing the preset program code, and execute the update instruction to update the working status of each target handling equipment.

In some embodiments, the control system may further include a display electrically connected to the management platform. In some embodiments, the management platform may display the working status of each target handling equipment through the display, so that the staff may instantly know a current status of each target handling equipment and a specific handling situation, which facilitates coordination.

In some embodiments of the present disclosure, through the manner shown in process 400, the industrial IoT and a use of handling equipment to handle cargo are combined, which makes the process of handling cargo more time-saving and labor-saving, improves an efficiency of the handling of cargo, and reduces a probability of errors in the handling process. The manner is applicable to scenarios in which warehousing operations and handling control operations are complicated or diversified, a requirement of cargo handling in great warehouses is satisfied.

In some embodiments, after the determining the handling parameter of the target handling equipment in the handling area based on the cargo handling information and the target handling equipment information, the management platform may further perform the following steps.

S11: determining a cargo number of the cargo to be handled based on the cargo handling information.

In some embodiments, the cargo to be handled are of the same type. The cargo number of the cargo to be handled refers to the total weight (or the total number) of the cargo to be handled. In some embodiments, the management platform may obtain the cargo number of the cargo to be handled by counting based on the information of the cargo to be handled.

S12: determining a predicted handling time based on the cargo number, the optimal number of jobs for the target handling equipment in the handling area, and the handling volume.

The predicted handling time refers to a predicted time for the target handling equipment to handle all the cargo to be handled.

In some embodiments, the management platform may determine the predicted handling time based on the cargo number of the cargo to be handled, the optimal number of jobs of the target handling equipment in the handling area, and the handling volume, through the time prediction model. In some embodiments, the time prediction model is a machine learning model. For example, the time prediction model may include a long short-term memory (LSTM) model, etc.

In some embodiments, the time prediction model may be obtained based on training a great number of labeled samples. The samples of the time prediction model may include the cargo number of the sample cargo, the optimal number of jobs of the target handling equipment in a sample handling area, and the handling volume, and the labels may include an actual handling time corresponding to a sample cargo.

In some embodiments, the samples may be constructed based on historical data, and the labels may be determined based on manual labeling, etc.

In some embodiments, the management platform may input the samples into the time prediction model, and iteratively update the parameter of an initial time prediction model through training until the trained model satisfies a preset training condition, and a trained time prediction model is obtained. The preset training condition may be a loss function being less than a threshold, convergences, or a training period reaches a threshold. In some embodiments, the manner of iteratively updating the parameters of the model may include a conventional model training manner such as a random gradient descent.

S13: displaying the predicted handling time.

In some embodiments, the management platform may display the predicted handling time through a display for easy observation by staff.

According to some embodiments of the present disclosure, the cargo number of the cargo to be handled is determined based on the cargo handling information, then the predicted handling time is calculated based on the cargo number, the optimal number of jobs of the target handling equipment in the handling area, and the handling volume, and finally the predicted handling time is displayed, thereby facilitating the staff to arrange a work plan according to the predicted handling time to improve the efficiency of cargo handling.

FIG. 5 is a flowchart illustrating an exemplary manner for determining a handling area for cargo to be handled according to some embodiments of the present disclosure. As shown in FIG. 5, a process 500 includes the following steps. In some embodiments, the process 500 may be performed by a management platform.

S510, determining a starting position and an ending position of the cargo to be handled based on cargo handling information.

The starting position of the cargo to be handled refers to a position where the starting position of the cargo to be handled is located. The ending position of the cargo to be handled refers to the position where the ending position of the cargo to be handled is located. Referring to the descriptions of the cargo handling information in FIG. 4, it may be seen that the cargo handling information of the cargo to be handled includes the starting position and the ending position of the cargo to be handled. Therefore, the management platform may directly obtain the starting position and the ending position of the cargo to be handled based on the cargo handling information.

Step S520, obtaining a warehouse map.

The warehouse map refers to a visual indication of an internal spatial layout of a warehouse facility, which provides detailed information about an internal structure, an area division, an aisle, a storage position, and other key features of the warehouse. In some embodiments, the management platform may obtain the warehouse map through manual input by staff utilizing a graphical user interface (GUI). In some embodiments, the management platform may also collect warehouse spatial data through a collection equipment (e.g., an AGV, a drone) to obtain a warehouse map.

S530, determining an optimal handling route based on the warehouse map, the starting position, and the ending position.

The optimal handling route refers to the shortest handling route, the handling route with the lowest energy consumption, or a handling route with the least amount of time consumption, which is generated based on an actual situation of the warehouse.

In some embodiments, the management platform may determine the optimal handling route based on the warehouse map as well as the starting position and the ending position of the cargo to be handled by vector matching. For example, a database may include a plurality of candidate vectors and their corresponding candidate optimal handling routes. The candidate vectors may be constructed based on a historical warehouse map, a starting position and an ending position of a historical cargo to be handled. The candidate optimal handling routes corresponding to the candidate vectors may be determined based on actual optimal handling routes corresponding to the historical warehouse map as well as the starting position and the ending position of the historical cargo to be handled. In some embodiments, the management platform may construct a to-be-matched vector based on a current warehouse map, the starting position and the ending position of a current cargo to be handled, and separately calculate distances between the to-be-matched vector and a plurality of the candidate vectors. The candidate vector whose distance from the vector to be matched is less than a distance threshold is determined to be the target vector, and a reference optimal handling route corresponding to the target vector is determined to be a current optimal handling route. The distance threshold may be set manually in advance based on experience.

Figure 7:
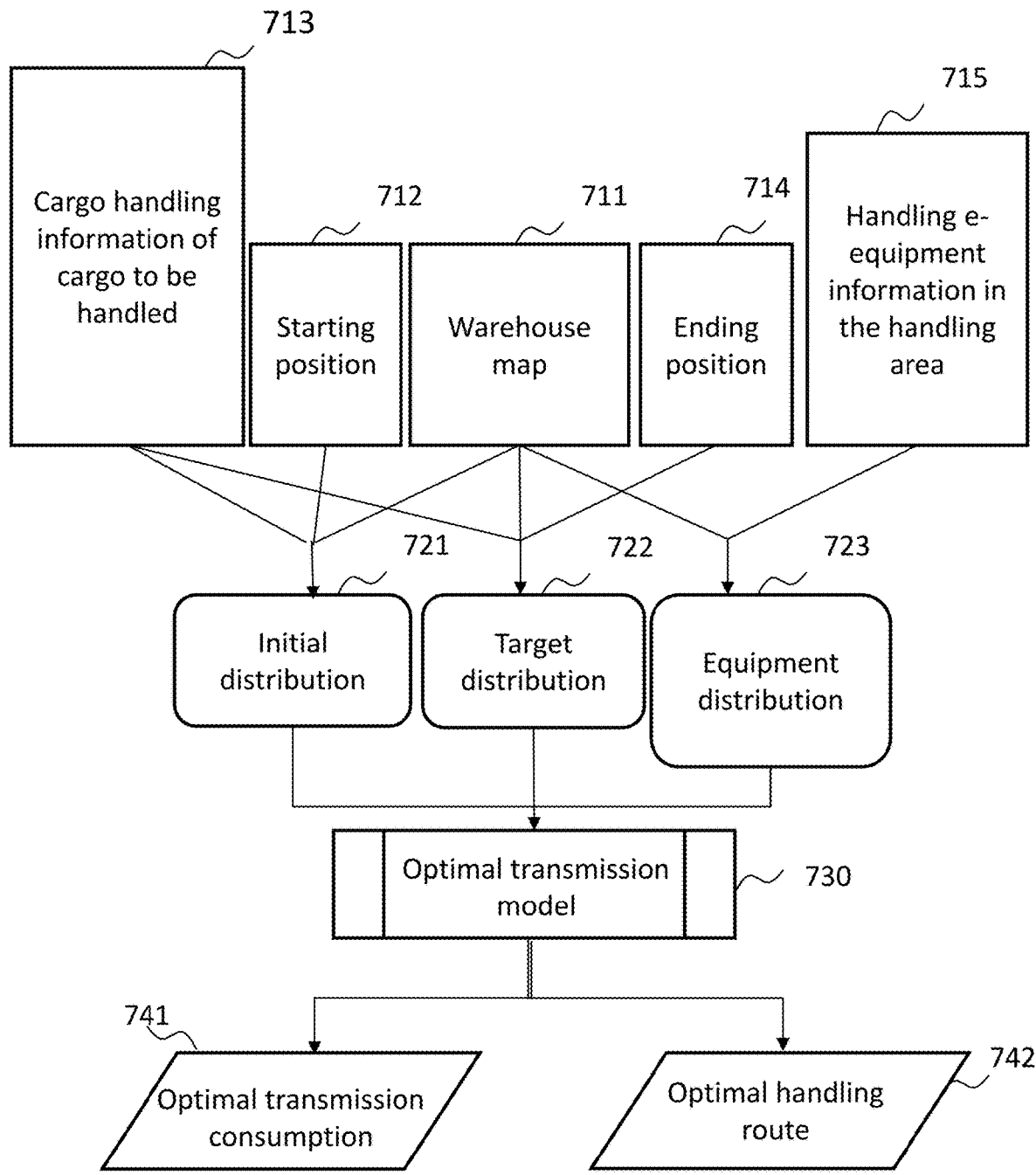
FIG. 7 is a schematic diagram illustrating an exemplary manner for determining an optimal handling route according to some embodiments of the present disclosure.
Figure 8:
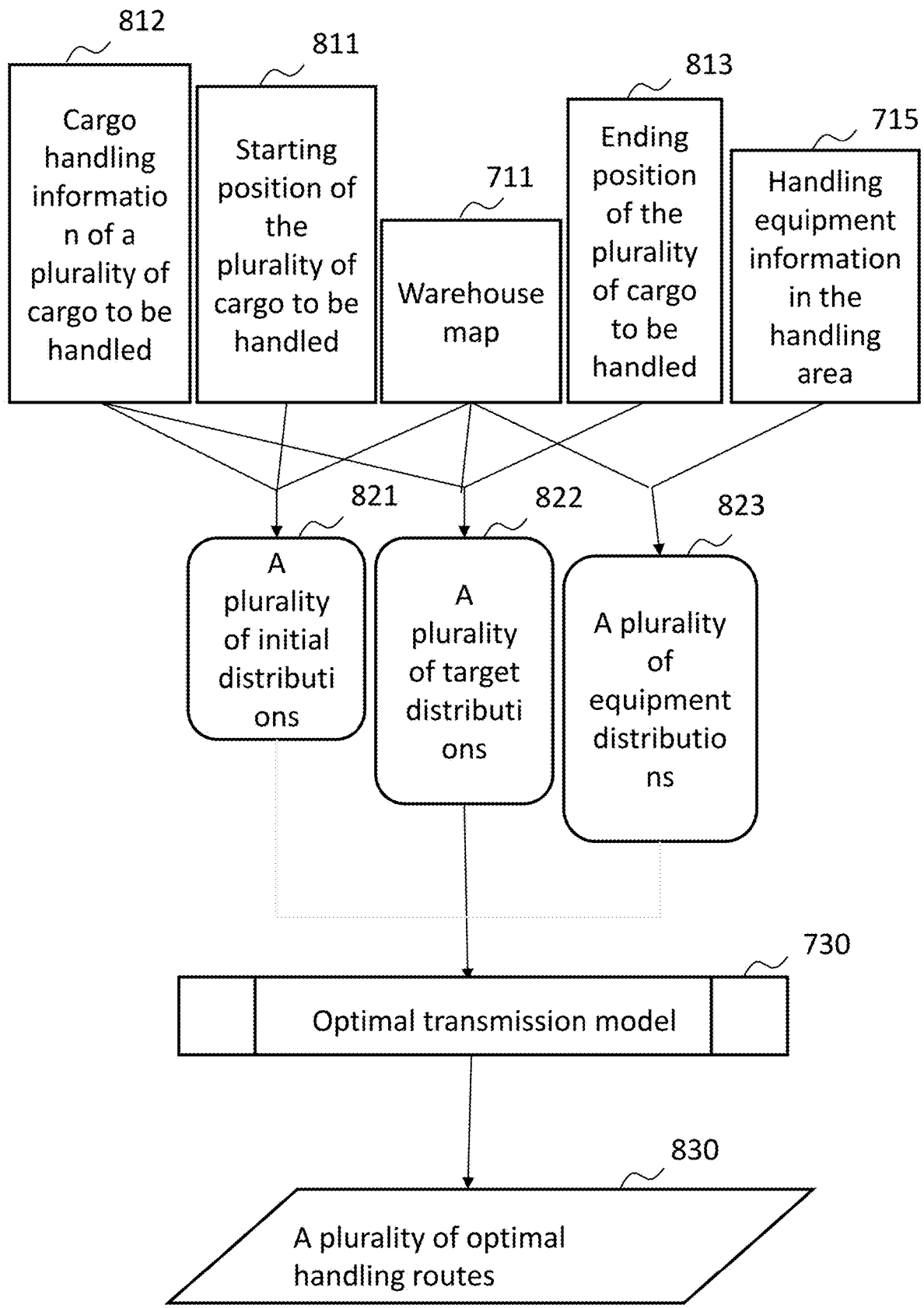
FIG. 8 is a schematic diagram illustrating an exemplary manner for determining a plurality of optimal handling routes according to some embodiments of the present disclosure.

For more information on how the management platform determines the optimal handling routes based on the warehouse map, the starting position and the ending position of the cargo to be handled, please refer to FIG. 6-FIG. 8 and the related descriptions.

S540, determining the handling area for the cargo to be handled based on the optimal handling route and the warehouse map.

In some embodiments, by dividing the warehouse map into at least one area, the management platform may determine the area through which the optimal handling route passes as the handling area for the cargo to be handled based on the optimal handling route and the warehouse map. The division of the warehouse map may be performed by the management platform based on the actual situation, or the division may be performed through manual inputting by the staff, etc.

In some embodiments of the present disclosure, an optimal handling route is determined by obtaining the warehouse map, and then combining the starting position and the ending position of the cargo to be handled, the handling area for the cargo to be handled may be quickly and accurately determined.

FIG. 6 is a flowchart illustrating an exemplary manner for determining an optimal handling route according to some embodiments of the present disclosure. As shown in FIG. 6, a process 600 includes the following steps. In some embodiments, the process 600 may be performed by a management platform.

S610, in response to that there is cargo handling information for a plurality of the cargo to be handled, determining a plurality of candidate handling routes based on a warehouse map, starting positions, and ending positions of the plurality of cargo to be handled.

The plurality of cargo to be handled refers to a number of different types or specifications of the cargo to be handled, for example, cargo A, cargo B, etc.

The candidate handling routes refer to handling routes that satisfy a preset condition. The preset condition may be set manually in advance. For example, the preset condition may include the handling route being the shortest path, etc. In some embodiments, each of the plurality of candidate handling routes corresponds to one type of the cargo to be handled, respectively. That is, each of the cargo to be handled corresponds to one candidate handling route.

To illustrate with only one type of the cargo to be handled (e.g., cargo A) as an example, in some embodiments, the management platform may determine the shortest path based on the warehouse map, the starting position and the ending position of the cargo to be handled (e.g., cargo A), through a path planning algorithm, and use the shortest path as the candidate handling route for the cargo to be handled (e.g., cargo A). Exemplary path planning algorithms may include a Dijkstra's algorithm, an A-algorithm, etc.

For more information on the cargo handling information, please refer to FIG. 4 and the related descriptions; and for more information on the warehouse map, please refer to FIG. 5 and the related descriptions.

Understandably, as the handling area is each area that the cargo to be handled passes through sequentially during the handling process, the candidate handling route is composed of a plurality of intervals, each interval corresponding to one handling area (or referred to as a handling sub-area), with adjacent intervals connected to each other, and each interval having a corresponding starting position and an end point called a sub-starting position and a sub-terminal point.

S620, determining a conflict interval based on the plurality of candidate handling routes, the cargo handling information for the plurality of cargo to be handled, and handling equipment information within the handling area.

The conflict interval refers to an interval in which there are at least two kinds of the cargo to be handled that need to be handled at the same time. In some embodiments, the management platform may determine the conflict interval based on the plurality of candidate handling routes, the cargo handling information of the plurality of cargo to be handled, and the handling equipment information in the handling area by the following steps.

S621: by comparing the plurality of candidate handling routes, determining the interval that exists in at least two candidate handling routes as a candidate conflict interval.

S622: sequentially determining whether each candidate conflict interval is the conflict interval. Taking one candidate conflict interval as an example, the following steps are included.

S6221: screening out all the candidate handling routes (hereinafter referred to as target candidate handling routes) where the current candidate conflict interval is located.

S6222: determining a predicted handling time period [handling starting time, handling ending time] for each of the target candidate handling routes in the candidate conflict interval.

Taking one target candidate handling route as an example, the management platform may obtain the cargo handling information of the cargo to be handled corresponding to the target candidate handling route and the handling equipment information in the handling area (the handling area includes the candidate conflict interval); and determine a load rating, a number, and a handling speed of the target handling equipment in each area (i.e., the handling sub-area) as well as a cargo number of the cargo to be handled based on the aforesaid information. All the target handling equipment in each area is put into operation by default, a required handling time in each area is calculated, and the predicted handling time for the target candidate handling route in the candidate conflict interval is determined.

For more information on the handling equipment information, please refer to FIG. 4 and the associated descriptions.

S6223: in response to that there are at least two target candidate handling routes partially or completely overlapping in a predicted handling period in the candidate conflict interval, determining the candidate conflict interval as the conflict interval.

Step S630, determining an alternate interval based on the conflict interval, the warehouse map, and the plurality of candidate handling routes.

The alternate interval refers to an update area in the warehouse map corresponding to the plurality of candidate handling routes. In some embodiments, the management platform may determine the alternate interval based on the conflict interval, the warehouse map, and the plurality of candidate handling routes by the following steps.

S631: marking the area corresponding to the plurality of candidate handling routes in the warehouse map as impassable and updating the warehouse map to obtain an updated warehouse map.

Understandably, the above step is meant to ensure that the alternate interval is unused in the next step of the path planning, otherwise the conflict interval may be replaced with another conflict interval, which is unable to effectively optimize the route.

S632: for a sub-starting position and a sub-ending position of the conflict interval, determining a second shortest path (which does not overlap with the conflict interval) based on the updated warehouse map using the path planning algorithm again. If there is no second shortest path, that is, no another route from the sub-starting position to the sub-ending position in the passable area, then confirming that there is no candidate interval. At this point, all the candidate handling routes corresponding to the conflict interval cannot be adjusted, and all the cargo to be handled corresponding to the candidate handling routes need to queue up and wait to be handled in the conflict interval, so this portion of the candidate handling routes may be confirmed as the optimal handling route.

S633: confirming whether the second shortest path is used as the alternate interval.

S6331: assuming that the two candidate handling routes corresponding to the cargo to be handled in the conflict interval where there is a time conflict are cargo A and cargo B, respectively. Where the end time of cargo A handling is earlier than the end time of cargo B handling and later than the start time of cargo B handling.

S6332: predicting a first duration and a second duration.

The first duration refers to the time required to complete the handling of the cargo to be handled (e.g., cargo B) with a later handling ending time in the conflict interval without changing routes. First duration=predicted waiting time+predicted handling time=(handling ending time of cargo A−handling starting time of cargo B)+(handling ending time of cargo B−handling starting time of cargo B). Notably, the above-mentioned handling starting time and handling ending time are estimated values. According to some embodiments of the present disclosure, the management platform may utilize step S6222 in a similar manner to obtain predicted handling time periods for the cargo A to be handled and the cargo B to be handled in the conflict interval, and thus determine the above handling starting time and handling ending time.

The second duration refers to the time required to complete the handling of the cargo to be handled (e.g., cargo B) with a later handling ending time in the conflict interval without a changing route, i.e., the second shortest path, from the sub-starting position to the sub-ending position. Second duration=predicted handling time=(handling ending time of cargo B−handling starting time of cargo B). The predicted handling time refers to a length of the predicted handling period of the cargo to be handled (e.g., cargo B) in the interval from the sub-starting position to the sub-ending position of the second shortest path. A calculation manner of the predicted handling time period may be referred to in step S6222, which is not repeated here.

S6333: determining a length relationship between the first duration and the second duration, and determining whether the second shortest path is used as the alternate interval. According to some embodiments of the present disclosure, if the first duration>the second duration, it indicates that switching route is faster than not switching route, then the second shortest path is used as the alternate interval; if the first duration<the second duration, it indicates that directly waiting in line without switching routes is faster than switching routes, then the second shortest path is not used as the alternate interval. In this case, the candidate handling route is not adjusted, and is directly used as the optimal handling route.

S640, determining a plurality of optimal handling routes based on the alternate interval, the conflict interval, and the plurality of candidate handling routes.

According to some embodiments of the present disclosure, the management platform may replace, based on the alternate interval, the conflict interval, and the plurality of candidate handling routes, the conflict interval in a route that reaches the conflict interval later among the candidate handling routes corresponding to the conflict interval where there is a time conflict with the alternate interval to obtain a new handling route, and use the new handling route as the optimal handling route. The rest of the candidate handling routes that do not have the conflict intervals are directly determined to be the optimal handling routes.

The determined optimal handling route may be made more relevant by further considering the presence of different types of cargo to be handled.

According to some embodiments of the present disclosure, the management platform may further determine, for the at least two candidate handling routes corresponding to the conflict intervals, a time consumption for replacing the conflict intervals with the alternate intervals, respectively; and, determine, based on the time consumption, the candidate handling routes that need to replace the conflict interval with the alternate interval, and obtain the optimal handling route.

The time consumption refers to the time consumed for completing handling at least to types of cargo corresponding to at least two candidate handling routes in the conflict area from the sub-starting position to the sub-ending position in the conflict area. The cargo types of the two types of the cargo to be handled may be the same or different.

Taking only two conflicting candidate handling routes as an example, the cargo to be handled by the candidate handling routes are cargo A and cargo B. The time consumption by the candidate handling route corresponding to cargo A in replacing the conflict intervals with the alternate intervals is recorded as a first time consumption, and the time consumption by the candidate handling route corresponding to cargo B in replacing the conflict intervals with the alternate intervals is recorded as a second time consumption.

In some embodiments, first time consumption=max{first time, second time}; second time consumption=max{third time, fourth time}. The first time refers to a time when the cargo B does not change route=and the handling is completed in the conflict interval; the second time refers to the time when the cargo A changes routes and the handling is completed in the alternate interval; the third time refers to a time when the cargo B changes routes and the handling is completed in the alternate interval; the fourth time refers to the time when the cargo A does not change routes and the handling is completed in the conflict interval. It is to be noted that the first time, the second time, the third time, and the fourth time may be obtained based on the predicted handling time period of the corresponding cargo to be handled in the corresponding interval (e.g., the conflict interval or the alternate interval, etc.). The calculation of the preset handling time period may be found in S6222, which is not repeated here.

In some embodiments, if the first time consumption>the second time consumption, it indicates that the case corresponding to the second time consumption (the cargo A does not change routes and the cargo B changes routes) corresponds to a shorter overall handling completion time, and therefore needs to be performed according to the case corresponding to the second time consumption, that is, the conflict interval in the candidate handling route corresponding to the cargo B is replaced by the alternate interval to obtain the new handling route, and the new handling route is taken as the optimal handling route; and the candidate handling route corresponding to the cargo A is not adjusted, and is directly taken as the optimal handling route. If the first time consumption<the second time consumption, it indicates that the case corresponding to the first time consumption (the cargo A changes routes and the cargo B does not change routes) corresponds to a shorter overall handling completion time, and therefore it is necessary to execute the case corresponding to the first time consumption, that is, the conflict interval in the candidate handling route corresponding to the cargo A is replaced by the alternate interval to obtain the new handling route, and the new handling route is taken as the optimal handling route, and the candidate handling route corresponding to the cargo B is not adjusted, and is directly taken as the optimal handling route.

According to some embodiments of the present disclosure, by comparing the time consumption (i.e., a time cost) of replacing the conflict interval for all of the candidate handling routes with conflicts, and using the candidate handling route with the shortest time consumption as the optimal handling route, an overall handling efficiency may be effectively improved.

In some embodiments, the management platform may further determine whether there are detachable cargo to be handled; and, in response to that there are detachable cargo to be handled, determine the plurality of optimal handling routes based on the alternate intervals, the conflict intervals, the plurality of candidate handling routes, and the detachable cargo to be handled.

In some embodiments, if the handling completion time of the cargo to be handled on the unchanged route (referred to as the first cargo) is earlier than the handling completion time of the cargo to be handled on the changed route (referred to as the second cargo), it indicates that there is a period of free time after the completion of the handling of the first cargo in the original conflict interval, and then this period of free time may be used for the handling of the second cargo (which are not yet handled), i.e., the second cargo is considered to be detachable. Then, when the conflict interval is in the period of free time, the optimal handling route for the second cargo has two sub-routes in the interval from the sub-starting position to the sub-ending position of the conflict interval. That is, when the conflict interval is in the period of free time, there are two optimal handling routes for the second good, and both routes may be used when handling.

On the contrary, if the handling completion time of the first cargo is later than the handling completion time of the second cargo, the second cargo is considered to be not detachable. At this time, the optimal handling route for the second cargo is not adjusted on the basis of the optimal handling route determined based on the time consumption as previously described.

By further considering whether the cargo to be handled is detachable to determine the optimal handling routes, the optimal handling routes may be further adjusted and optimized so as to obtain more appropriate and scientific handling routes.

It should be noted that the foregoing descriptions of the process 400, the process 500, and the process 600 are for the purpose of example and illustration only, and do not limit the scope of application of the present disclosure. For those skilled in the art, various corrections and changes may be made to the process 400, the process 500, and the process 600 under the guidance of the present disclosure. However, these corrections and changes remain within the scope of the present disclosure.

FIG. 7 is a schematic diagram illustrating an exemplary manner for determining an optimal handling route according to some embodiments of the present disclosure.

In some embodiments, a management platform may also determine an optimal handling route based on a warehouse map, a starting position and an ending position of cargo to be handled, by the following manner. As shown in FIG. 7, the management platform may establish an initial distribution 721 of the cargo to be handled in the warehouse map based on a warehouse map 711, a starting position 712 of the cargo to be handled, and cargo handling information 713 of the cargo to be handled. The management platform may establish a target distribution 722 of the cargo to be handled in the warehouse map based on the warehouse map 711, an ending position 714 of the cargo to be handled, and the cargo handling information 713 of the cargo to be handled, and further establish an equipment distribution 723 of handling equipment in the warehouse map based on the warehouse map 711 and handling equipment information 715 in a handling area, and determine an optimal transmission consumption 741 and an optimal handling route 742 based on an optimal transmission model 730.

For more information about the warehouse map, the starting positions and the ending positions of the cargo to be handled, the cargo handling information of the cargo to be handled, the handling equipment information in the handling area and the optimal handling routes, please refer to the relevant descriptions in the previous sections (e.g., FIG. 4-FIG. 6).

The initial distribution may be used to indicate a distribution of the cargo to be handled in their current storage status in the warehouse map. For example, the initial distribution may include an initial position distribution of the starting position of the cargo to be handled in the warehouse map, a cargo type distribution, a cargo mass distribution, etc. In some embodiments, the management platform may establish the initial distribution of the cargo to be handled in the warehouse map based on the warehouse map, the starting position of the cargo to be handled, and the cargo handling information by marking the warehouse map.

The target distribution may be used to indicate a distribution of the target storage status of the cargo to be handled in the warehouse map. For example, the target distribution may include an ending position distribution of the ending position of the cargo to be handled in the warehouse map, the cargo type distribution, the cargo mass distribution, etc. In some embodiments, the management platform may establish the target distribution of the cargo to be handled in the warehouse map based on the warehouse map, the ending position of the cargo to be handled, and the cargo handling information by marking on the warehouse map.

The equipment distribution may be used to indicate the distribution of handling equipment in the warehouse map. For example, the equipment distribution may include a position distribution, an equipment type distribution, a number distribution, etc. of the handling equipment in the warehouse map. In some embodiments, by marking the warehouse map, the management platform may establish an equipment distribution of the handling equipment in the warehouse map based on the warehouse map, the handling equipment information in the handling area.

The optimal transmission model refers to a model for determining the optimal handling route. In some embodiments, the optimal transmission model is a machine learning model. For example, the optimal transmission model may include one or a combination of a convolutional neural networks (CNN) model, a recurrent neural network (RNN) model, or other custom models.

In some embodiments, an input to the optimal transmission model may include the initial distribution, the target distribution, and the equipment distribution, and an output of the optimal transmission model may include the optimal transmission consumption and the optimal handling route. The optimal transmission consumption includes one or more of a time consumption, a distance consumption, and an energy consumption.

The time consumption refers to a time consumed to complete the handling of the cargo to be handled. The distance consumption refers to a handling distance by all target handling equipment. The energy consumption refers to an amount of electricity (or oil) consumed by all the target handling equipment.

In some embodiments, the optimal transmission model may be obtained by training based on a great number of first training samples with first labels. The first training sample may include a sample initial distribution, a sample target distribution, and a sample equipment distribution, and the first label may include an actual optimal transmission consumption and an actual optimal handling route corresponding to the first training samples.

In some embodiments, the first training sample may be constructed based on historical data.

In some embodiments, the first label includes a label for the optimal transmission consumption and a label for the optimal handling route. The first label may be determined experimentally based on the first training sample. Merely by way of example, designing a plurality of handling routes based on the first training samples and performing a plurality of handlings, obtaining the time consumption, the distance consumption, and the energy consumption for each handling, and performing a weighted average on the time consumption, the distance consumption, and the energy consumption of each handling to obtain an average consumption value for each handling, and determining the handling route with the smallest average consumption value in the plurality of handlings as the label of the optimal handling route. A weighted weight may be set manually in advance based on experience. And the label of the optimal transmission consumption is an actual time consumption, an actual distance consumption, and an actual energy consumption corresponding to the optimal transmission route.

In some embodiments, the management platform may input the first training samples into an initial optimal transmission model, iteratively update the parameter of the initial optimal transmission model through training until the trained model satisfies the preset training conditions, and obtain a trained optimal transmission model. The preset training condition may be that a loss function is less than a threshold, converges, or a training period reaching a threshold. In some embodiments, a manner of iteratively updating the parameter of the model may include a conventional model training method such as a random gradient descent.

In some embodiments, the input to the first training sample may also include a cost function and a constraint. The cost function is used to indicate a relationship between a coordinate transformation of the cargo to be handled in the handling area and the cost. For example, the cost function may be a cost of time, distance, energy consumption, etc. The constraint is used to ensure that the output optimal handling routes satisfy various constraints and requirements of a real problem, and the constraint may be embedded into the optimal transmission model in different forms, for example, as the constraint on the optimization problem or as a model parameter. The constraint may include an equipment number constraint, a handling requirement constraint, an equipment capacity constraint, a transmission cost constraint, etc. In some embodiments, the optimal transmission model may also be established and solved based on a Kantorovich model, a model with entropy regularization, a Sinkhorn algorithm, a proximity point algorithm and a Sinkhorn algorithm, a linear programming, a convex optimization, or other optimization algorithms, etc.

According to some embodiments of the present disclosure, determining the optimal transmission route through a trained optimal transmission model may effectively ensure a reasonableness and an accuracy of the optimal transmission route and obtain the most scientific handling route, which effectively improves the efficiency of the handling of cargo, saves a handling time and a handling cost.

FIG. 8 is a schematic diagram illustrating an exemplary manner for determining a plurality of optimal handling routes according to some embodiments of the present disclosure.

In some embodiments, a management platform may also determine a plurality of optimal handling routes based on a warehouse map as well as a starting position and an end position of cargo to be handled in the following manner. As shown in FIG. 8, in response to that there is cargo handling information for a plurality of cargo to be handled, the management platform may establish a plurality of initial distributions 821 of the plurality of cargo to be handled in the warehouse map based on the warehouse map 711, the starting positions 811 of the plurality of the cargo to be handled, and the cargo handling information 812 of the plurality of the cargo to be handled. The management platform may further establish, based on the warehouse map 711, the ending positions 813 of the plurality of cargo to be handled, and the cargo handling information 812 of the plurality of cargo to be handled, a plurality of target distributions 822 of the plurality of cargo to be handled in the warehouse map. The management platform may further establish a plurality of equipment distributions 823 of the plurality of handling equipment in the warehouse map based on the warehouse map 711, and the handling equipment information 715 in the handling area.

For more contents about the warehouse map, the cargo handling information of the cargo to be handled, the starting positions and the ending positions of the cargo to be handled, the handling equipment information in the handling area, an optimal transmission model, and the optimal handling routes, please refer to the relevant descriptions in previous sections (e.g., FIG. 4-FIG. 7).

The plurality of initial distributions may be used to indicate a distribution of the plurality of cargo to be handled in the current storage status in the warehouse map. The plurality of target distributions may be used to indicate a distribution of target storage status of the plurality of the cargo to be handled in the warehouse map. The plurality of equipment distributions may be used to indicate a distribution of the plurality of handling equipment in the warehouse map. For more on the initial distribution, the target distribution, and the equipment distribution, please refer to FIG. 7 and the related descriptions.

It should be noted that the manner of establishing the plurality of initial distributions, the plurality of target distributions, and the plurality of equipment distributions may be found in the relevant descriptions of establishing the initial distributions, the target distributions, and the equipment distributions in FIG. 7, which is not repeated here.

In some embodiments, an input to the optimal transmission model may include the plurality of initial distributions, the plurality of target distributions, and the plurality of equipment distributions, and an output of the optimal transmission model may include the plurality of optimal handling routes. In this embodiment, the input to the optimal transmission model may also include a cost function and a constraint. For more contents on the cost function and the constraint, please refer to FIG. 7 and the related descriptions.

In some embodiments, the optimal transmission model may be obtained by training based on a great number of second training samples with second labels. The second training samples may include a sample plurality of initial distributions, a sample plurality of target distributions, and a sample plurality of equipment distributions, and the second labels may include a plurality of actual optimal transmission routes corresponding to the second training samples.

In some embodiments, the second training sample may be determined based on historical data.

In some embodiments, the manner of obtaining the second label is similar to the manner of obtaining the first label, which is described in FIG. 7 and the related descriptions.

In some embodiments, the training of the optimal transmission model includes: determining different training sample sets and their corresponding labels based on a plurality of types of the cargo to be handled; and training the different training sample sets according to their size.

Understandably, the greater a number of types of the cargo to be handled, the greater a number of the optimal handling routes is determined, and the more complex the computation. The number of types of the cargo to be handled are different, and the corresponding training sample sets are different. For example, when there is only one type of the cargo to be handled, it corresponds to one training sample set; when there are two types of the cargo to be handled, it corresponds to another training sample set. In some embodiments, the second training samples include a plurality of training sample sets, and the second labels include labels corresponding to the plurality of training sample sets.

In some embodiments, different training sample sets have different learning rates during training, which are determined based on a route reliability of the training sample sets and a proportion of the training sample.

The learning rate refers to a hyperparameter when updating a weight during a gradient descent. The lower the learning rate, the slower a loss function changes, and the easier it is to overfit.

The proportion of the training sample refers to a ratio of the second training samples corresponding to a number of each type to all the second training samples, i.e., the ratio of a sample number of the current second training sample in the training sample set to a total sample number contained in all the training sample sets. For example, there are a total of 1000 second training samples divided into 4 training sample sets according to the number of types of the cargo to be handled (e.g., 1, 2, 3, 4). The number of types of the cargo to be handled is 2 (i.e., there are 2 types of the cargo to be handled), which corresponds to 300 second training samples, then the sample number within the corresponding training sample set is 300, and the proportion of the training sample=300/1000=30% when the number of types of the cargo to be handled is 2.

The route reliability may be used to assess a reliability of an optimal transmission route. Take the same training sample set as an example, a plurality of sets of same or similar second training samples (hereinafter referred to as "each set of similar training samples") are contained therein. If a plurality of sets of similar training samples correspond to a plurality of labels that are consistent or mostly consistent, then a training effect is better; if the plurality of labels are inconsistent, i.e., with the same or similar second training samples, the optimal transmission routes differ greatly, then the training effect is poor. In this case, the similarity of the plurality of sets of second training samples may be determined by a distance metric (e.g., a Euclidean distance, a Manhattan distance, or a cosine similarity, etc.)

In some embodiments, the management platform may calculate the route reliability by the following steps.

S21: obtaining a variance of label values of each set of similar training samples by calculation. The label value may be a consumption value obtained by performing a weighted average on a time consumption, a distance consumption, and an energy consumption in the optimal transmission consumption, for more details, please refer to related descriptions of the manner for determine the first label in FIG. 7.

S22: maximum-minimum normalizing the obtained variance of label values of each set of similar training samples to within a range [0, 1].

S23: performing a weighted average on the variance of label values of each set of similar training samples after the maximum-minimum normalizing to obtain an overall label variance of the training sample set. A weight of the weighting is a proportion of the sample number of each set of similar training samples in the sample number of the training sample set.

S24: calculating the route reliability of the training sample set based on the overall label variance. The smaller the overall label variance, the greater the route reliability of the training sample set. An exemplary formula is: route reliability=1−overall label variance for the training sample set.

In some embodiments, the management platform may determine an initial learning rate based on the proportion of the training sample; and then determine a learning rate adjustment step based on the route reliability of the training sample set. The greater the proportion of the training sample, the lower a value of the initial learning rate in a preset range.

The learning rate adjustment step refers to a magnitude or a step size by which the learning rate is adjusted in each iteration. In some embodiments, the lower the route reliability of the training sample set, the shorter the learning rate adjustment step; and the higher the route reliability of the training sample set, the longer the learning rate adjustment step. This is because the unreliability means that it is more difficult to learn, and therefore a slower drop in the learning rate prevents the model from skipping over a local optimum solution during the training process, which results in a failure to converge. In some embodiments, the learning rate adjustment step may also be manually adjusted or updated during the training process based on an actual training situation.

By considering the number of types of the cargo to be handled when determining different training sample sets as well as the corresponding labels, it is possible to make the optimal transmission model obtained from training more intelligent and thus improve the prediction accuracy of the optimal transmission model.

Aiming at a situation that there may actually be a variety of the cargo to be handled in the warehouse, according to some embodiments of the present disclosure, by utilizing a trained optimal transmission model, it is possible to obtain a plurality of optimal transmission routes that are more in line with the actual situation, thereby contributing to a further improvement in an overall cargo handling efficiency, saving handling time and handling cost.

Figure 9:
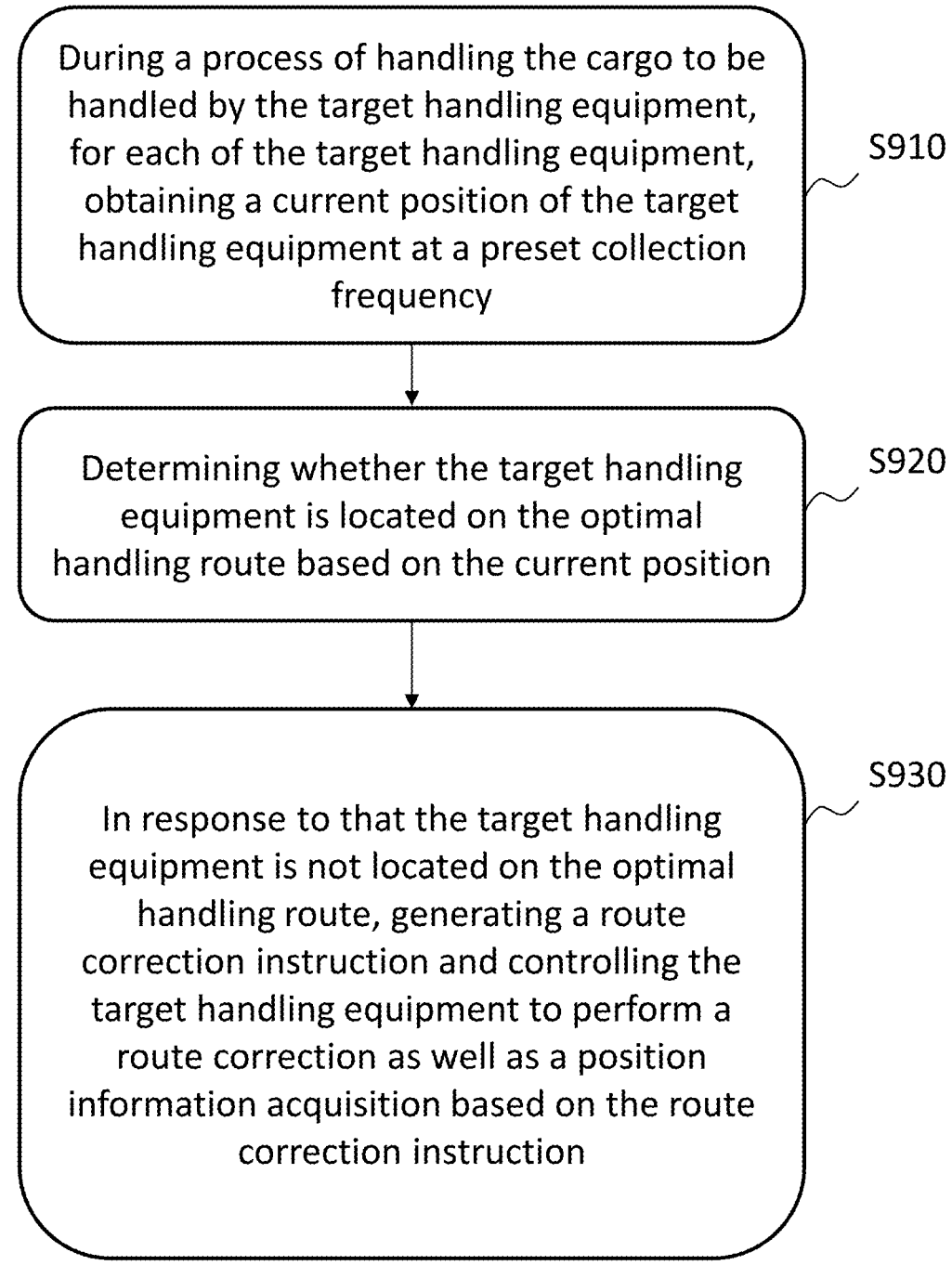
FIG. 9 is a flowchart illustrating an exemplary route correction manner according to some embodiments of the present disclosure.

FIG. 9 is a flowchart illustrating an exemplary route correction manner according to some embodiments of the present disclosure. As shown in FIG. 9, a process 900 includes the following steps. In some embodiments, process 900 may be performed by a management platform.

S910, during a process of handling cargo to be handled by target handling equipment, for each of the target handling equipment, obtaining a current position of the target handling equipment at a preset collection frequency.

The current position of the target handling equipment refers to a position of the target handling equipment in a handling area at a time of information collection. For more about the target handling equipment, and the handling area please refer to the relevant descriptions in previous section (e.g., FIGS. 4-8).

The preset collection frequency refers to a preset collection rate or collection times. In some embodiments, the preset collection frequency may be a default, empirical, or experimental value, etc. In some embodiments, the preset collection frequency is correlates to a route complexity of the current handling area. For example, the more complex the routes in the current handling area, the higher the preset collection frequency.

The route complexity of the current handling area may be used to indicate a complexity of the routes within the current handling area. In some embodiments, the route complexity may be indicated in terms of a numerical value or a rank. For example, the route complexity may take value in a range of [0, 1]. In some embodiments, the management platform may determine the route complexity for the current handling area using a complexity model.

The complexity model refers to a model used to determine the route complexity of the current handling area. In some embodiments, the complexity model is a machine learning model. For example, the complexity model may include a CNN model, etc.

In some embodiments, an input to the complexity model may include a route map and image information for the current handling area, and an output of the complexity model may include the route complexity for the current handling area.

The route map refers to a graphical indication of a plurality of handling routes. In some embodiments, the management platform may generate the route map based on a plurality of optimal handling routes, utilizing a geographic information system (GIS) technology, etc.

The image information of the current handling area may be used to reflect a situation related to the handling route in the current handling area, for example, a width of the handling route, objects around the handling route, etc. In some embodiments, the management platform may shoot the current handling area based on a monitoring equipment (e.g., a camera, etc.) or the handling equipment with a camera in the warehouse to obtain the image information of the current handling area. In some embodiments, the image information of the current handling area may also be obtained based on manual input after shot by a staff member.

In some embodiments, the complexity model may be obtained by training based on a great number of third training samples with third labels. The third training sample may include a sample route map and the image information of the sample current handling area, and the third label may include an actual route complexity of the current handling area corresponding to the third training sample.

In some embodiments, the third training sample may be determined based on historical data.

In some embodiments, the third label may be determined based on a travel situation of the target handling equipment corresponding to the third training sample. For example, the more or more severe the target handling equipment yawing, the higher the route complexity is considered to be, at which point the third label approaches to 1. In some embodiments, the third label may be manually adjusted.

In some embodiments, the management platform may input the third training sample into an initial complexity model, iteratively update a parameter of the initial complexity model through training until the trained model satisfies a preset training condition, and a trained complexity model is obtained. The preset training condition may be that a loss function is less than a threshold, converges, or a training period reaches a threshold. In some embodiments, the manner of iteratively updating the parameter of the model may include a conventional model training manner such as random gradient descent.

By analyzing the route map and the image information of the current handling area through the trained complexity model, the route complexity of the current handling area may be accurately determined, then based on the route complexity, a preset collection frequency may be further determined, and the current position of the target handling equipment may be targeted obtained, so that the data collection frequency may be dynamically increased or decreased, and an overall data volume may be reduced on the basis of making the obtained data volume satisfy requirements of a route monitoring, so as to improve the processing efficiency of the management platform and save resources at the same time.

In some embodiments, the management platform may obtain the current position of the target handling equipment at the preset collection frequency through a positioning technology such as a Bluetooth angle of arrival (AOA), a RFID, a datagram transport layer security (DTLS), etc. For example, the management platform may utilize the RFID technology to identify and track the target handling equipment with an RFID tag by transmitting a wireless signal at the preset collection frequency to obtain the current position of the target handling equipment.

It should be noted that, in a process of handling the cargo to be handled by the target handling equipment, for each target handling equipment, the management platform may also obtain the current position of the target handling equipment in real time by means of the above-described localization technology, which is described in detail according to some embodiments of the present disclosure.

S920, determining whether the target handling equipment is located on the optimal handling route based on the current position.

In some embodiments, the management platform may compare the current position of the target handling equipment with the optimal handling route (e.g., path coordinates, constraint edges, etc., of the optimal handling route). If a deviation between the current position of the target handling equipment and the optimal handling route does not satisfy a preset deviation condition, the management platform may determine that the target handling equipment is not on the optimal handling route. The preset deviation condition may include a deviation between the current position of the target handling equipment and the optimal handling route exceeding a deviation threshold, etc. In some embodiments, the deviation threshold may be determined based on experience.

S930, in response to that the target handling equipment is not located on the optimal handling route, generating a route correction instruction and controlling the target handling equipment to perform a route correction as well as a position information collection based on the route correction instruction.

The route correction instruction refers to an instruction related to controlling the target handling equipment to perform the route correction. In some embodiments, the route correction instruction includes updating route and updating a collection frequency.

The updating route refers to updating the optimal handling route of the target handling equipment. In some embodiments, for the current position and the next handling area (equivalent to a sub-ending position) of the target handling equipment, the management platform may obtain a new handling route by a path planning algorithm (e.g., a Dijkstra algorithm, an A-algorithm, etc.) or an optimal transmission model.

Updating the collection frequency refers to updating the collection frequency. In some embodiments, a new collection frequency needs to be greater than the preset collection frequency to increase a frequency of route monitoring during the route correction process. In some embodiments, the new collection frequency may be positively correlated to the route complexity of the updated route while being greater than the preset collection frequency. For example, the higher the route complexity of the update route, the higher the new collection frequency. It should be noted that the manner of determining the route complexity of the update route is similar to the manner of determining the route complexity of the current handling area as described in the previous section, which is not repeated here.

In some embodiments, in response to the target handling equipment not being located on an optimal handling route, the management platform may automatically generate the route correction instruction based on a program logic by executing a preset program code, and send the route correction instruction to the target handling equipment. When the target handling equipment receives the route correction instruction, it immediately executes the route correction instruction to travel on the new handling route and obtain position information (e.g., the current position, etc.) at the new collection frequency.

In some embodiments of the present disclosure, by determining whether the target handling equipment is located on the optimal handling route, and generating the route correction instruction to control the target handling equipment to perform route correction and position information collection when the target handling equipment is not located on the optimal handling route, not only a yawing degree of the target handling equipment may be reduced as much as possible, but also the monitoring of the entire handling process may be improved.

In some embodiments, the handling area includes a first handling area and a second handling area. The target handling equipment within the handling area includes at least one first target handling equipment within the first handling area and at least one second target handling equipment within the second handling area.

The first handling area and the second handling area are only for distinguishing different handling areas through which the cargo to be handled passes in the handling process. It should be noted that the first handling area and the second handling area may be divided according to a stacking type of cargo at different positions in the warehouse, a topography of the warehouse, and other factors.

Similarly, the first target handling equipment and the second target handling equipment are only for distinguishing between the target handling equipment within different handling areas.

It may be appreciated that the handling equipment in the at least one first target handling equipment are all of the same type, and the handling equipment in the at least one second target handling equipment are all of the same type, and that the equipment type of the at least one first target handling equipment may be the same as or different from the equipment type of the at least one second target handling equipment.

For more about the handling area, the cargo to be handled, and the target handling equipment, please refer to the relevant descriptions in the previous sections (e.g. FIG. 4-FIG. 9).

Figure 10:
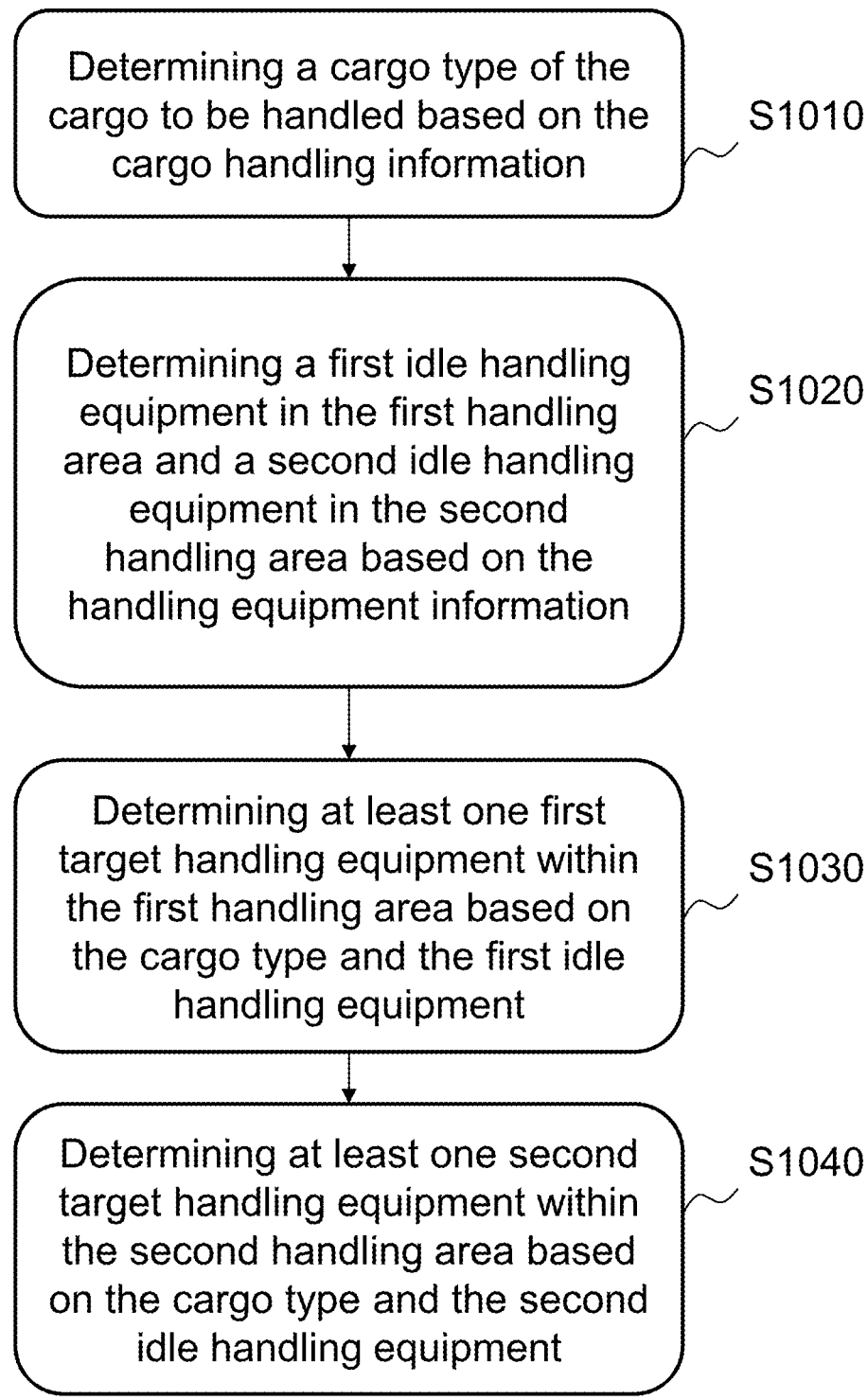
FIG. 10 is a flowchart illustrating an exemplary manner for determining target handling equipment according to some embodiments of the present disclosure.

FIG. 10 is a flowchart illustrating an exemplary manner for determining target handling equipment according to some embodiments of the present disclosure. As shown in FIG. 10, a process 1000 includes the following steps. In some embodiments, process 1000 may be performed by a management platform.

S1010, determining a cargo type of cargo to be handled based on cargo handling information.

As described in the previous section (FIG. 4), the cargo handling information of the cargo to be handled includes a type or a specification of the cargo to be handled, so the management platform may directly obtain the cargo type of the cargo to be handled based on the cargo handling information.

S1020, determining a first idle handling equipment in the first handling area and a second idle handling equipment in the second handling area based on the handling equipment information.

The idle handling equipment refers to all handling equipment that is in an idle status. The first idle handling equipment, the second idle handling equipment are only used to differentiate between idle handling equipment located in different handling areas. In some embodiments, the management platform may determine a position of the handling equipment by means of a positioning technology such as the RFID, an ultra-wide bandwidth (UWB), a Wi-Fi, etc., so as to determine the handling equipment located within the first handling area and the handling equipment located within the second handling area. In some embodiments, the handling equipment located within the first handling area and the handling equipment located within the second handling area may also be manually set or labeled by staff.

As described in the previous section (FIG. 4), the handling equipment information includes basic parameters of the handling equipment, such as a type or a specification of the handling equipment, a load rating of the handling equipment, a size of the handling equipment, a battery capacity of the handling equipment, a speed of the handling equipment, an equipment status of the handling equipment and other related parameters. The equipment status of the handling equipment includes an idle-busy status of the handling equipment. Thus, the management platform may determine, based on the handling equipment information, the handling equipment that is in the idle status, and then determine the handling equipment that is located within the first handling area and is in the idle status as the first idle handling equipment in the first handling area, and then determine the handling equipment that is located in the second handling area and is in the idle status as a second idle handling equipment in the second handling area.

S1030, determining at least one first target handling equipment within the first handling area based on the cargo type and the first idle handling equipment.

In some embodiments, the management platform may screen, based on the cargo type and the first idle handling equipment, the target handling equipment from the first idle handling equipment through a first preset relationship table, thereby obtaining at least one first target handling equipment in the first handling area. The first preset relationship table may be used to indicate a correspondence between the cargo type of the cargo to be handled and the target handling equipment. One cargo type of the cargo to be handled corresponds to one target handling equipment. In some embodiments, the first preset relationship table may be constructed based on the cargo type of historical cargo to be handled and historical target handling equipment.

S1040, determining at least one second target handling equipment within the second handling area based on the cargo type and the second idle handling equipment.

In some embodiments, the management platform may screen, based on the cargo type and the second idle handling equipment, the target handling equipment from the second idle handling equipment through a second preset relationship table, thereby determining at least one second target handling equipment in the second handling area. It should be noted that the second preset relationship table is similar to the first preset relationship table, which is not repeated here.

According to some embodiments of the present disclosure, by extracting the cargo type from the cargo handling information of the cargo to be handled, and then determining the idle handling equipment within different handling areas based on the handling equipment information, so as to quickly and accurately obtain at least one target handling equipment in different handling areas based on the cargo type and idle handling equipment.

FIG. 11 is a flowchart illustrating an exemplary manner for determining a handling parameter according to some embodiments of the present disclosure. As shown in FIG. 11, a process 1100 includes the following steps. In some embodiments, the process 1100 may be performed by a management platform.

S1110, obtaining a load rating of a target handling equipment in a handling area.

The load rating of the target handling equipment refers to a maximum weight of cargo that the target handling equipment is designed to safely carry. In some embodiments, the management platform may scan barcodes, QR codes, or RFID tags, etc., of the target handling equipment by a scanning equipment (e.g., a scanner, etc.) to obtain the load rating of the target handling equipment in the handling area. In some embodiments, the load rating of the target handling equipment in the handling area may also be obtained by manual input from a staff member.

For more about the handling area and the target handling equipment, please refer to the previous (e.g. FIG. 4-FIG. 10) related descriptions.

S1120, determining a handling volume corresponding to a single target handling equipment in the handling area based on cargo handling information and the load rating.

In some embodiments, the management platform may determine, based on the cargo handling information of the cargo to be handled, a single weight of the cargo to be handled; and, determine, based on the single weight of the cargo to be handled and the load rating of the target handling equipment, the handling volume corresponding to the single target handling equipment in the handling area. For more descriptions of the handling volume, please refer to the descriptions in FIG. 4.

The single weight of the cargo to be handled refers to a weight of each piece of the cargo to be handled. In some embodiments, the cargo handling information of the cargo to be handled may include the single weight of the cargo to be handled, so the management platform may directly determine the single weight of the cargo to be handled based on the cargo handling information.

In some embodiments, the management platform may determine, based on the single weight of the cargo to be handled and the load rating of the target handling equipment, the handling volume corresponding to the single target handling equipment in the handling area by calculation. For example, handling volume corresponding to the single target handling equipment=single weight of the cargo to be handled×maximum number of handlings. The maximum handling volume may be obtained by calculating a quotient of the load rating of the target handling equipment and the single weight of the cargo to be handled, and then rounding the quotient to an integer.

It may be appreciated that the handling volume corresponding to the single target handling equipment may be the same as, or different from, the corresponding load rating. For example, if the load rating of the single target handling equipment is 1 ton, but the single weight of the cargo to be handled is 300 kg, then the handling volume corresponding to the single target handling equipment is 900 kg, at this time the handling volume corresponding to the single target handling equipment differs from the corresponding load rating. If the single weight of the cargo to be handled is 200 kg, then the handling volume corresponding to the single target handling equipment is 1 ton, and the corresponding handling volume of the single target handling equipment is the same as the corresponding load rating.

By using the single weight of the cargo to be handled and the load rating of the target handling equipment, the handling volume of the single target handling equipment in the handling area may be quickly determined.

S1130, determining an optimal number of jobs for the target handling equipment in the handling area based on the handling volume and target handling equipment information.

In some embodiments, the management platform determines the optimal number of jobs of the target handling equipment within the handling area based on the handling volume and the target handling equipment information corresponding to the single target handling equipment. A process for the determination includes: determining an optimal number ratio of the target handling equipment in the handling area based on a handling speed, a handling distance, and the handling volume; and determining the optimal number of jobs for the target handling equipment in the handling area based on a number of the target handling equipment in the handling area and the optimal number ratio. For more detailed descriptions of the optimal number of jobs, please refer to the description in FIG. 4.

The handling speed refers to a moving speed of the target handling equipment. The handling distance refers to a handling distance for the target handling equipment to handle the cargo. For more contents on the handling speed and the handling distance of the target handling equipment, please refer to the relevant descriptions in FIG. 4.

The optimal number ratio of the target handling equipment in the handling area refers to a proportion of the optimal number of jobs for the target handling equipment in the handling area to a total number of all of the target handling equipment. Assuming that the handling area consists of three areas, X1, X2, and X3, and that the corresponding handling volumes of the target handling equipment in the handling area X1, the target handling equipment in the handling area X2, and the target handling equipment in the handling area X3 is 200 kg, 400 kg, and 800 kg, respectively, the corresponding handling speed is 0.5 m/s, 0.8 m/s, and 1 m/s respectively, and the corresponding handling distance is 500 m, 800 m, and 1000 m respectively, then a handling time ration of the handling area X1, the handling area X2, and the handling area X3 is 1:1:1. At this time, a proportion relationship of the optimal number ratio of the corresponding target handling equipment in the three handling areas is 4:2:1. When the number ratio values of the target handling equipment in each handling area satisfy the proportion relationship of the corresponding optimal number ratio, all of the target handling equipment are in a working status or a moving status during the handling process.

In some embodiments, the management platform may obtain the optimal number of jobs for the target handling equipment in the handling area by calculation based on the number and the optimal number ratio of the target handling equipment in the handling area. An exemplary formula includes: optimal number of jobs of the target handling equipment in the handling area=total number of the target handling equipment×the optimal number ratio of the target handling equipment in the handling area.

In the above-described embodiment, the optimal number ratio of the target handling equipment in each handling area is determined based on the handling speed, the handling distance, and the handling volume, and then the optimal number of jobs of the target handling equipment in each handling area may be quickly determined based on the number and the optimal number ratio of the target handling equipment in each handling area.

In some embodiments of the present disclosure, according to the cargo handling information of the cargo to be handled and the load rating of the target handling equipment, it is possible to quickly determine the handling volume corresponding to the single target handling equipment in the handling area, and then according to the handling volume and the target handling equipment information, the optimal number of jobs of the target handling equipment in the handling area is quickly determined, and the overall processing time is short, which lays a foundation for the subsequent rapid generation of a handling instruction.

Figure 12:
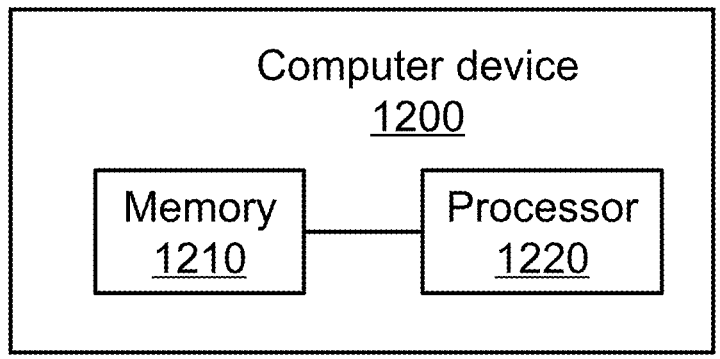
FIG. 12 is a diagram illustrating an exemplary structure of a computer equipment according to some embodiments of the present disclosure.

FIG. 12 is a diagram illustrating an exemplary structural of a computer equipment according to some embodiments of the present disclosure.

Some embodiments of the present disclosure also provide a computer equipment. As shown in FIG. 12, a computer equipment 1200 includes a memory 1210 and a processor 1220, with the memory 1210 storing a computer program run on the processor 1220. The processor 1220 executes the computer program to implement the aforementioned control method for handling equipment based on an industrial (IoT).

The basic concepts have been described above, and it is apparent to those skilled in the art that the foregoing detailed disclosure serves only as an example and does not constitute a limitation of the present disclosure. While not expressly stated herein, those skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

What is claimed is:

1. A control method for handling equipment based on an industrial internet of things (IoT), which is used in the industrial IoT system, wherein the industrial IoT system includes a management platform, the method is executed by the management platform, and the method includes:
   obtaining cargo handling information for cargo to be handled;
   determining a handling area for the cargo to be handled based on the cargo handling information, wherein the handling area refers to each area that the cargo to be handled passes through sequentially during a handling process;
   obtaining the cargo handling information and handling equipment information in the handling area;
   determining target handling equipment within the handling area based on the cargo handling information and the handling equipment information; wherein a type of the target handling equipment within the same the handling area is the same;
   obtaining a load rating of the target handling equipment in the handling area; determining a handling volume corresponding to the target handling equipment in the handling area based on the cargo handling information and the load rating;
   obtaining target handling equipment information for the target handling equipment in the handling area; the target handling equipment information including a handling speed, a handling distance, and a number of the target handling equipment, and determining an optimal number of jobs for the target handling equipment in the handling area based on the handling volume and the target handling equipment information; and
   controlling the target handling equipment in the handling area based on the optimal number of jobs to handle the cargo to be handled from a current handling area of the target handling equipment to a next handling area;
   wherein the determining an optimal number of jobs for the target handling equipment in the handling area based on the handling volume and the target handling equipment information includes:
      determining an optimal number ratio of the target handling equipment in the handling area based on the handling speed, the handling distance, and the handling volume; and
      determining the optimal number of jobs for the target handling equipment in the handling area based on a number of the target handling equipment in the handling area and the optimal number ratio.

2. The control method of claim 1, wherein the obtaining cargo handling information for cargo to be handled; and determining a handling area for the cargo to be handled based on the cargo handling information-includes:
   obtaining the cargo handling information for cargo to be handled, and determining a starting position and an ending position of the cargo to be handled based on the cargo handling information;
   obtaining a warehouse map;
   determining an optimal handling route based on the warehouse map, the starting position, and the ending position; and
   determining the handling area for the cargo to be handled based on the optimal handling route and the warehouse map.

3. The control method of claim 2, wherein the obtaining a warehouse map; and obtaining the determining an optimal handling route based on the warehouse map, the starting position, and the ending position further includes:
- obtaining the warehouse map, and establishing an initial distribution of the cargo to be handled in the warehouse map based on the warehouse map, the starting position, and the cargo handling information;
- establishing a target distribution of the cargo to be handled in the warehouse map based on the warehouse map, the ending position, and the cargo handling information; and
- determining the optimal handling route based on an optimal transmission model; the optimal transmission model being a machine learning model, an input of the optimal transmission model including the initial distribution, the target distribution, and the equipment distribution, an output of the optimal transmission model including an optimal transmission consumption and the optimal handling route, the optimal transmission consumption including one or more of a time consumption, a distance consumption, and an energy consumption.

4. The control method of claim 2, wherein the method further includes:
- during a process of handling the cargo to be handled by the target handling equipment, for each of the target handling equipment, obtaining a current position of the target handling equipment in real time;
- determining whether the target handling equipment is located on the optimal handling route based on the current position; and
- in response to that the target handling equipment is not located on the optimal handling route, generating route deviation information and displaying the route deviation information on a monitoring center; and
- in response to that the target handling equipment is located on the optimal handling route, determining a remaining moving time and a remaining moving distance of the target handling equipment from the current position to a next handling area based on the current position, and generating route monitoring information based on the remaining moving time and the remaining moving distance.

5. The control method of claim 1, wherein the handling area includes a first handling area and a second handling area; and the target handling equipment within the handling area includes at least one first target handling equipment in the first handling area and at least one second target handling equipment in the second handling area;
- the determining target handling equipment within the handling area based on the cargo handling information and the handling equipment information, includes:
- determining a cargo type of the cargo to be handled based on the cargo handling information;
- determining a first idle handling equipment in the first handling area and a second idle handling equipment in the second handling area based on the handling equipment information;
- determining at least one first target handling equipment within the first handling area based on the cargo type and the first idle handling equipment; and
- determining at least one second target handling equipment within the second handling area based on the cargo type and the second idle handling equipment.

6. The control method of claim 1, wherein the determining a handling volume corresponding to a single target handling equipment in the handling area based on the cargo handling information and the load rating includes:
- determining a single weight of the cargo to be handled based on the cargo handling information; and
- determining the handling volume corresponding to the single target handling equipment in the handling area based on the single weight of the cargo to be handled and the load rating.

7. The control method of claim 1, wherein after the obtaining target handling equipment information for the target handling equipment in the handling area; the target handling equipment information including a handling speed, a handling distance, and a number of the target handling equipment, and determining an optimal number of jobs for the target handling equipment in the handling area based on the handling volume and the target handling equipment information, the control method further includes:
- determining a cargo number of the cargo to be handled based on the cargo handling information;
- determining a predicted handling time based on the cargo number, the optimal number of jobs of the target handling equipment in the handling area, and the handling volume; and
- displaying the predicted handling time.

8. A control system for handling equipment based on an industrial internet of things (IoT), including a management platform, the management platform being configured with:
- a handling area generation module configured to obtain cargo handling information of cargo to be handled; and determine a handling area of the cargo to be handled based on the cargo handling information, wherein the handling area refers to each area that the cargo to be handled passes through sequentially during a handling process;
- a target handling equipment generation module configured to obtain handling equipment information within the handling area; and determine target handling equipment within the handling area based on the cargo handling information and the handling equipment information; wherein the target handling equipment in the same handling area is at least one handling equipment of a same type;
- a handling volume calculation module configured to obtain a load rating of the target handling equipment in the handling area; determine a handling volume corresponding to the target handling equipment in the handling area based on the cargo handling information and the load rating;
- an optimal number of jobs calculation module configured to obtain target handling equipment information of the target handling equipment within the handling area; wherein the target handling equipment information includes a load rating, a handling speed, a handling distance, and a number of the target handling equipment; and determine an optimal number of jobs of the target handling equipment within the handling area based on the cargo handling information and the target handling equipment information;
- a handling control module configured to control the target handling equipment in the handling area based on the optimal number of jobs to handle the cargo to be handled from a current handling area of the target handling equipment to the next handling area;
- wherein to determine an optimal number of jobs of the target handling equipment within the handling area based on the cargo handling information and the target handling equipment information, the optimal number of jobs calculation module is further configured to:

determine an optimal number ratio of the target handling equipment in the handling area based on the handling speed, the handling distance, and the handling volume; and determine the optimal number of jobs for the target handling equipment in the handling area based on a number of the target handling equipment in the handling area and the optimal number ratio.

9. A computer equipment including a memory and a processor, wherein the memory stores a computer program runnable on the processor, and the processor executes the computer program to implement a control method for handling equipment based on an industrial internet of things (IoT), which is used in a control system for handling equipment based on the industrial IoT, wherein the system includes a management platform, the method is executed by the management platform, and the method includes:

obtaining cargo handling information for cargo to be handled;

determining a handling area for the cargo to be handled based on the cargo handling information, wherein the handling area refers to each area that the cargo to be handled passes through sequentially during a handling process;

obtaining the cargo handling information and handling equipment information in the handling area;

determining target handling equipment within the handling area based on the cargo handling information and the handling equipment information; wherein a type of the target handling equipment within the same the handling area is the same;

obtaining a load rating of the target handling equipment in the handling area; determining a handling volume corresponding to the target handling equipment in the handling area based on the cargo handling information and the load rating;

obtaining target handling equipment information for the target handling equipment in the handling area; the target handling equipment information including a load rating, a handling speed, a handling distance, and a number of the target handling equipment and determining an optimal number of jobs for the target handling equipment in the handling area based on the handling volume and the target handling equipment information; and controlling the target handling equipment in the handling area based on the optimal number of jobs to handle the cargo to be handled from a current handling area of the target handling equipment to a next handling area;

wherein the determining an optimal number of jobs for the target handling equipment in the handling area based on the handling volume and the target handling equipment information includes:

determining an optimal number ratio of the target handling equipment in the handling area based on the handling speed, the handling distance, and the handling volume; and determining the optimal number of jobs for the target handling equipment in the handling area based on a number of the target handling equipment in the handling area and the optimal number ratio.

\* \* \* \* \*